(12) United States Patent
Leahy

(10) Patent No.: US 8,869,492 B2
(45) Date of Patent: *Oct. 28, 2014

(54) STRUCTURAL BUILDING PANELS WITH INTERLOCKING SEAMS

(71) Applicant: Charles H. Leahy, Asheville, NC (US)

(72) Inventor: Charles H. Leahy, Asheville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/034,419

(22) Filed: Sep. 23, 2013

(65) Prior Publication Data

US 2014/0053481 A1   Feb. 27, 2014

Related U.S. Application Data

(63) Continuation-in-part of application No. 12/493,375, filed on Jun. 29, 2009, now Pat. No. 8,590,264, and a continuation-in-part of application No. 12/493,394, filed on Jun. 29, 2009, now Pat. No. 8,539,732.

(51) Int. Cl.
| | |
|---|---|
| *E04B 1/61* | (2006.01) |
| *E04C 2/52* | (2006.01) |
| *E04B 1/14* | (2006.01) |
| *E04B 7/22* | (2006.01) |
| *E04B 7/04* | (2006.01) |
| *E04B 1/343* | (2006.01) |
| *F24J 2/04* | (2006.01) |

(52) U.S. Cl.
CPC ............. *E04B 1/34321* (2013.01); *E04C 2/521* (2013.01); *E04B 1/6179* (2013.01); *E04B 1/14* (2013.01); *F24J 2/0444* (2013.01); *E04B 7/22* (2013.01); *E04B 7/04* (2013.01); *Y02B 10/20* (2013.01); *E04B 1/6183* (2013.01)
USPC ............... 52/766; 52/774; 52/767; 52/782.1; 52/309.9; 52/592.1

(58) Field of Classification Search
USPC ........... 52/745.13, 309.9, 309.11, 782.1, 474, 52/766, 767, 768, 775, 774, 220.2, 745.1, 52/794.1, 742.14, 588.1, 592.1; 446/114, 446/115, 116
See application file for complete search history.

(56) References Cited

U.S. PATENT DOCUMENTS

| | | | | |
|---|---|---|---|---|
| 4,575,981 | A * | 3/1986 | Porter | 52/309.9 |
| 4,748,780 | A * | 6/1988 | Vinther | 52/309.3 |
| 5,424,118 | A * | 6/1995 | McLaughlin | 428/314.8 |
| 5,497,589 | A * | 3/1996 | Porter | 52/309.7 |
| 5,755,068 | A * | 5/1998 | Ormiston | 52/314 |
| 5,950,389 | A * | 9/1999 | Porter | 52/586.1 |
| 6,029,416 | A * | 2/2000 | Andersson | 52/592.1 |
| 6,240,704 | B1 * | 6/2001 | Porter | 52/794.1 |
| 6,599,621 | B2 * | 7/2003 | Porter | 428/322.2 |
| 7,493,731 | B2 * | 2/2009 | Zhang | 52/270 |
| 7,892,631 | B2 * | 2/2011 | Bauer | 428/218 |
| 8,539,732 | B2 * | 9/2013 | Leahy | 52/745.13 |
| 8,590,264 | B2 * | 11/2013 | Leahy | 52/745.13 |

* cited by examiner

*Primary Examiner* — Chi Q Nguyen
(74) *Attorney, Agent, or Firm* — Triangle Patents, PLLC

(57) ABSTRACT

Systems and methods providing a modular building having pre-fabricated panel wall components are easily assembled to form a predetermined, energy efficient structure that provides for mating alignment and securement of the modular panels with each other along their adjoining seams.

20 Claims, 31 Drawing Sheets

FLUSH ROOF DETAIL

OVERHANGING ROOF DETAIL

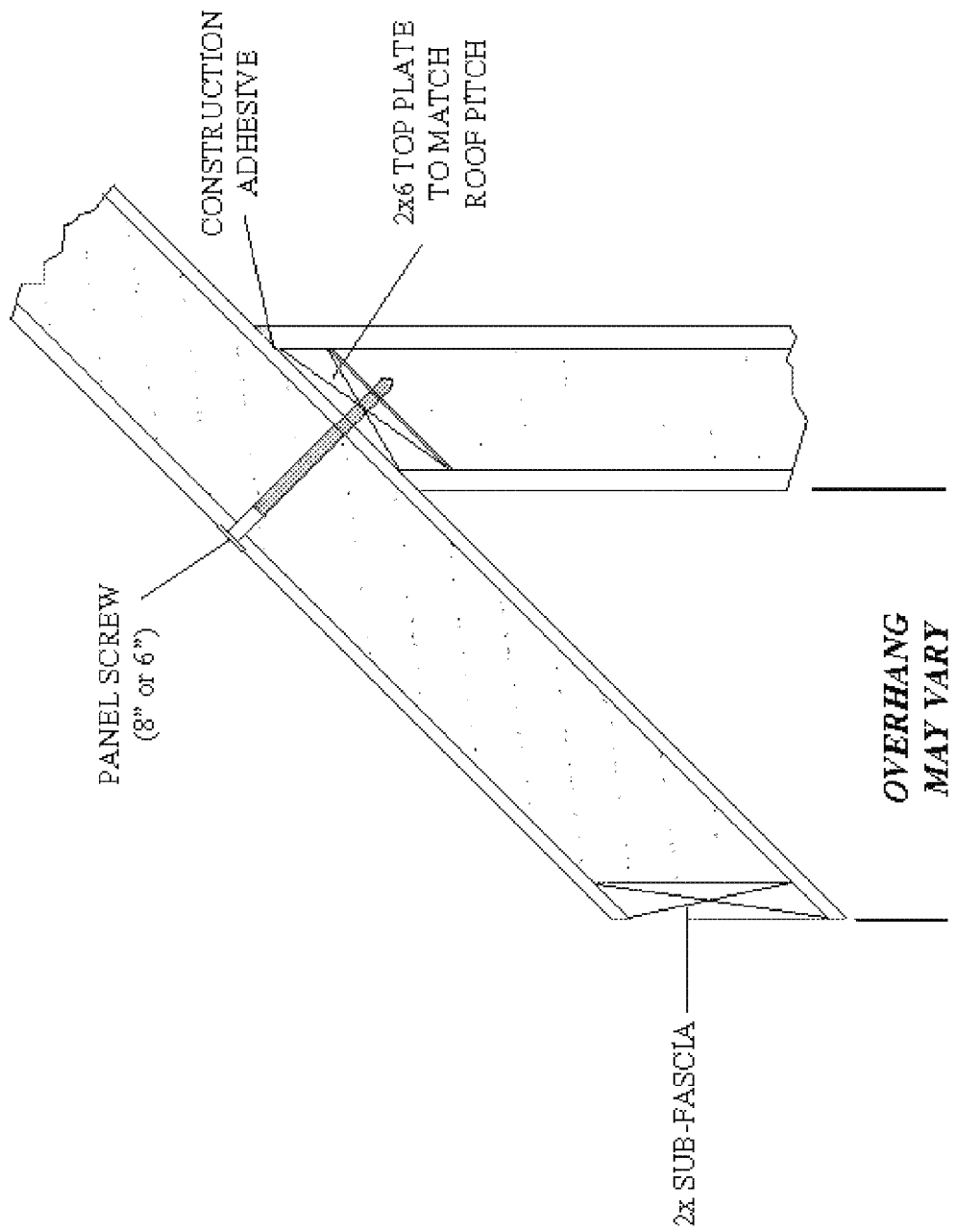

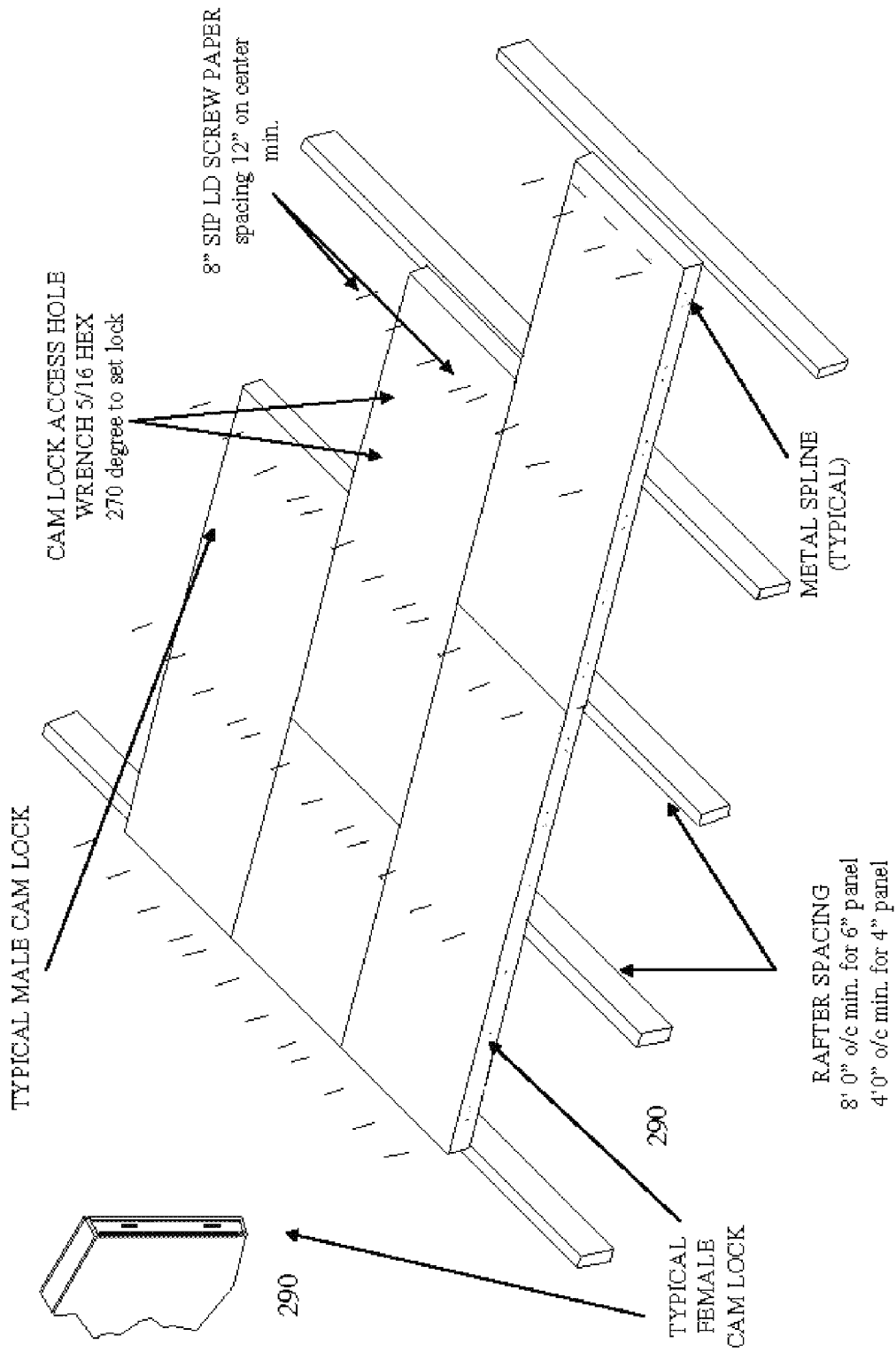

STRUCTURAL BUILDING PANELS WITH INTERLOCKING SEAMS

CROSS-REFERENCE TO RELATED APPLICATIONS

This application is a continuation-in-part of U.S. application Ser. No. 12/493,375, filed Jun. 29, 2009, issued as U.S. Pat. No. 8,590,264, and U.S. application Ser. No. 12/493,394, filed Jun. 29, 2009, issued as U.S. Pat. No. 8,539,732, both of which are herein incorporated by reference in their entirety.

BACKGROUND OF THE INVENTION

1. Field of the Invention

The present invention relates generally to modular building systems and methods, and more particularly, to modular building systems and methods for making them and for installing them to form a building structure.

2. Description of the Prior Art

Modular buildings and components used in making them are known in the art. By way of example, prefabricated housing components, including wall panels are known. However, after windows and doors, energy losses most commonly occur in the seam or joint regions of structures, including prefabricated buildings and modular structural components. Additionally, while prefabricated panels and other components are known in the art, they are not structured or configured for quick and easy assembly to form a predetermined completed structure that also provides for an energy efficient structure that is also stable and reliable, i.e., able to withstand the natural elements including storm conditions. Sheer forces produced by large wind events (i.e. hurricanes, etc.) or seismic (earthquake) events can quickly render traditional building corners ineffective at maintaining the structural integrity of the building. There further exists a need for energy efficient structures that prevent heat and/or cooling losses through the seam or joint region of the structure, which, after windows and doors, is the most common area of energy loss in modular building structures.

Examples of relevant art includes the following U.S. patent documents:

U.S. Pat. No. 6,564,521, issued May 20, 2003 to Brown et al. for "Structural sandwich panels and method of manufacture of structural sandwich panels," teaches rigid structural members, profiles, joints, and forms added to structural sandwich panels to provide higher strength, integral joining joint and single facing sheet manufacturing. The joints provide for mating alignment via vertically oriented rigid members and corresponding elongated recesses. However, these members are provided for alignment and require the securement of joined abutting structural sandwich panels together with cam-locks.

U.S. Pat. No. 5,344,700 for "Structural panels and joint connector arrangement therefore," describes a tongue-in-groove joint combined with a rod-like connecting mechanism.

U.S. Pat. No. 5,373,678 for "Structural panel system" also uses tongue-in-groove joints.

U.S. Pat. No. 5,950,389 for "Splines for joining panels" and U.S. Pat. No. 5,628,158 for "Structural insulated panels joined by insulated metal faced splines," which provides for metal splines that are glued into slots in adjacent panels.

U.S. Pat. No. 5,842,314 for "Metal reinforcement of gypsum, concrete or cement structural insulated panels" and U.S. Pat. No. 5,349,796 for "Building panel & method" teach improvements for reinforcement and strengthening structural panels using metal strips, and shear rail structures that function like I-beams to strengthen the panel, respectively.

U.S. Pat. No. 5,519,971 for "Building panel, manufacturing method and panel assembly system," and U.S. Pat. No. 5,373,678 for "Structural panel system" describe the use of a header to interconnect adjacent panels; notably, the header is not mentioned in connection with an increased load-bearing capacity for the panels.

None of the prior art addresses the longstanding need for stable, energy efficient modular building structures, including kits for installing same, in particular having structurally locked wall panel components that are aligned with a mating multiple rail track and interlocking or interconnecting edge system. Thus there remains a need for energy efficient and stable modular building systems and methods for manufacturing and for installing them to form a building structure having energy efficient seams that provide for simultaneous alignment and friction-based locking of the panels at the joints.

SUMMARY OF THE INVENTION

The present invention provides modular building systems and methods for manufacturing and installing them.

One aspect of the present invention is to provide systems for a modular building having structural prefabricated wall panel components that are juxtapositioned, aligned and interconnected along their edges to form joints or seams, wherein the wall components are assembled and locked in place to form an energy efficient and stable modular buildings including energy efficient seams that provide for simultaneous alignment and friction-based locking of the panels at the joints, and further including energy efficient modular components that provide for seamless, insulated corners and panels.

Another aspect of the present invention is to provide methods for manufacturing energy efficient and stable modular building systems having energy efficient seams or joints including energy efficient corners and panels that are seamless and that provide for simultaneous alignment and friction-based locking of the panels at the joints.

Another aspect of the present invention is to provide methods for installing energy efficient and stable modular building systems having energy efficient seams or joints including energy efficient corners and panels that are seamless and that provide for simultaneous alignment and friction-based locking of the panels at the joints.

Another aspect of the present invention is to provide a modular panel that is either insulative or non-insulative, but that still provides energy efficient corners that are seamless and that provide for structural integrity and strength.

Still another aspect of the present invention is to provide a modular building system with prefabricated composite wall panels that include conduits in the panel body with conduit input/output openings along predetermined edge areas of the panel body, and energy efficient seams or joints that provide for simultaneous alignment and friction-based locking of the panels at the joints. Methods for manufacturing and installation of the modular building systems are also considered aspects of the present invention. These and other aspects of the present invention will become apparent to those skilled in the art after a reading of the following description of the preferred embodiment when considered with the drawings, as they support the claimed invention.

BRIEF DESCRIPTION OF THE DRAWINGS

FIGS. 1-31 illustrate various views related to the present invention.

FIG. 1 illustrates a perspective view of a partially assembled modular building structure.

FIG. 2 shows a perspective view of a completed modular building from the partially completed illustration of FIG. 1.

FIG. 3 illustrates several related views; in FIG. 3A a top view of two edges of modular wall panels having mating double railing for alignment and locking mechanism; FIG. 3B illustrates an end perspective view illustrating the parallel spaced apart double track or railing system; FIG. 3C illustrates a side view and cut-away of joined panel edges with the interlocking cam-based locking mechanism.

FIG. 4 illustrates a top view of a corner wall panel modular component with seamless corner and two wall component segments integrally connected therewith and extending outwardly therefrom.

FIG. 5A illustrates a top view of a corner wall panel modular component with seamless corner and two wall component segments extending outwardly therefrom.

FIG. 5B illustrates a "T" cross-section a top view of a corner wall panel modular component with seamless corner and three wall component segments extending outwardly therefrom.

FIG. 5C illustrates a "+" cross-section a top view of a corner wall panel modular component with seamless corner and four wall component segments extending outwardly therefrom.

FIG. 6 illustrates several perspective views of the modular building components including FIG. 6A showing a basic flat wall panel component; FIG. 6B showing a 90 degree corner panel component; FIG. 6C showing a 135 degree angle corner panel or transition panel; FIG. 6D showing a window opening in a wall panel component; FIG. 6E showing a door opening in a wall panel component.

FIG. 7 illustrates an exploded view of various component panels.

FIG. 8 illustrates various component roof panels.

FIG. 9 illustrates a cut-away partial side view of a wall panel installation according to one aspect of the present invention.

FIG. 10A illustrates a cut-away partial perspective view of a wall panel installation according to one aspect of the present invention; FIG. 10B illustrates a partial perspective view of a section of FIG. 10A; FIG. 10C shows a cut-away side view of a section of FIG. 10A.

FIG. 11 illustrates a cut-away partial perspective view of a wall panel installation according to one aspect of the present invention.

FIG. 12 illustrates a cut-away partial perspective view of a wall panel installation according to one aspect of the present invention, including two stages of corner panel installation. FIG. 12A illustrates the installation of the one piece corner first and FIG. 12B illustrates subsequent installation of a wall panel over the plate.

FIG. 13 illustrates a cut-away partial perspective view of a wall panel installation of two components constructed and configured for connection following the step illustrated in FIG. 12B.

FIG. 14 illustrates a cut-away partial perspective view of a wall panel installation according to one aspect of the present invention, including a unitary and integral single component seamless corner panel and wall panel components connected thereto.

FIG. 15A and FIG. 15B illustrate a cut-away partial perspective view of a wall panel installation according to one aspect of the present invention with a window panel and door panel, respectively.

FIG. 16A illustrates a cut-away partial perspective view of a wall panel for a non-load bearing split window panel; FIG. 16B illustrates a standard wall panel with window section (non-split); FIG. 16C illustrates a cut-away partial perspective view of a wall panel for a load bearing split window panel; FIG. 16D illustrates a front view of FIG. 16C components when assembled.

FIG. 17 illustrates a partial perspective view of wall panel components when assembled at a seam.

FIG. 18A illustrates a perspective view of an adjuster panel with asymmetrically mating seams (male and female mating seams); FIG. 18B illustrates a perspective view of an adjuster panel with symmetrical mating seams (female-female with double strip spline connector) and connector.

FIG. 19 illustrates components and steps for reassembly.

FIG. 20 illustrates a cut-away partial front view of an assembly including components of the present invention.

FIG. 21 illustrates a cut-away partial front view of a ridge panel for roof installation.

FIG. 22 illustrates a cut-away partial perspective view of a roof installation including panels.

FIG. 23 illustrates components and steps for assembly of split panels having beam pockets as shown assembled in FIG. 17.

FIG. 24 illustrates another embodiment of components and steps for assembly of split panels having beam pockets.

FIG. 25A illustrates a cut-away partial perspective view of a header condition component wall panel; FIG. 25B illustrates a cut-away partial perspective view of a co-linear condition component wall panel.

FIG. 26 illustrates a partial cut-away front view of an installation of components according to the present invention.

FIG. 28 illustrates a front partial view of an overhand roof assembly.

FIG. 29 illustrates a partial perspective view of a roof assembly, including a close-up view of a female camlock area of a roof panel according to the present invention.

FIG. 30 illustrates a cross-sectional view of a panel.

FIG. 31 illustrates the x-, y- and z-dimensions of a panel.

DETAILED DESCRIPTION

Figure 1:
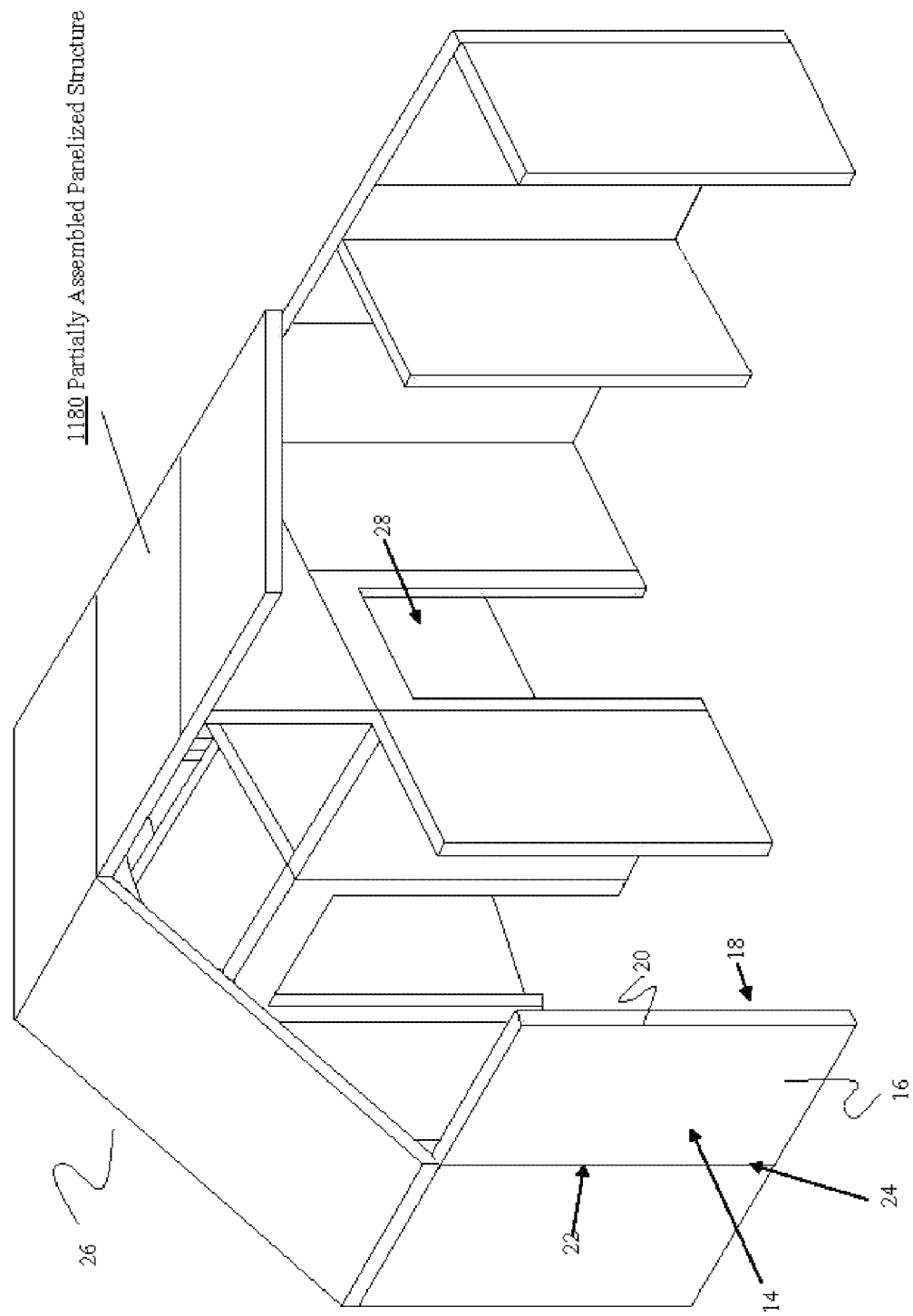

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides systems and methods for an energy efficient and stable modular building that is self-contained within a standard shipping container, wherein systems and methods for manufacturing and for installing them to form a building structure having energy efficient seams that provide for simultaneous alignment and friction-based locking of the panels at the joints. More particularly these systems and methods include pre-fabricated and insulated panel wall components that are easily assembled via interlocking or interconnecting edges that provide for at least some friction-based locking when connected to form a predetermined structure. These systems and methods may further include energy efficient corner modulars that provider for seamless, insulated corners. Further, additional locking mechanisms for increased securement and locking of at least two wall panel components at their joined edges or seams are provided, for example using a cam-based component connector system.

In one embodiment, a cam-based connector provides for mating alignment and locking of the modular panel components with each other along their adjoining seams wherein the cam based connector extends between a first unlocked position and a second position. At least two edges are first aligned by the mating, dual track alignment seams when the cam-based connector is in the first position and then the connector is moved to the second position to lock the wall components together. While the interlocking cam mechanism is desirable for providing additional securement at the joints between two panels, it is not a requirement for stability. The cam based connector has a female and a male component—the male component having a base and an arm or hook, the base allowing for a tool or key to be inserted and rotated in order to rotate the arm or hook. The female component receives the arm or hook, optionally through the use of a pin over which a hook may rest and lock.

Another aspect of the present invention is to provide a modular building system with prefabricated composite wall panels having the interlocking or interconnecting edges having friction-based seams that further include conduits provided within the panels; these conduits may optionally be pre-wired. Methods for installation of the modular building system include the steps of providing prefabricated modular building components, including modular panel components having edges with interconnecting interfaces for aligning, connecting, and securing panel components together at their edges and forming an energy efficient seam thereby, and further including energy efficient corner modular components that provide for seamless, insulated corners; assembling the modular housing by arranging and connecting the composite wall panels, which may include conduits for electrical and/or plumbing disposed within the interior section of the composite wall panels, including input/output openings for wiring, etc. Further, the methods may include prefabricated modular wall panels and instructions for assembly; arranging, aligning, and connecting the composite wall panels at their mating edges for providing friction-based locking of at least two panels. Also, steps for activating additional locking or securement mechanisms for two joined panels at the seam areas are provided.

Referring now to the drawings in general, the illustrations are for the purpose of describing a preferred embodiment of the invention and are not intended to limit the invention thereto. As illustrated in the figures, components of a modular building are shown, including modular wall panel components having edges for matingly interlocking or interconnecting at least two panels at those edges to from a seam. Modular building materials are shown including interlocking pre-engineered and pre-insulated panels that are constructed and configured to be quickly attached together by juxtapositioning, aligning, interconnecting, and securely connecting two panel components of the interleavable laminae along their respective edges to form the walls, roof, and/or floor of a structure. The figures further include connecting energy efficient corner modular components that provide for seamless, insulated corners, wherein the corner modular components are connected to other non-corner modular components, i.e., wall panel components, at corresponding edges as for described herein for aligning, connecting or joining, and securing the basic wall panel components.

The present invention provides for systems and methods for a modular building having structural prefabricated wall panel components that are juxtapositioned, aligned and interconnected along their edges to form joints or seams, wherein the wall components are aligned, assembled, connected and locked in place along corresponding or mating edges thereby forming seams, and by connecting a multiplicity of predetermined panel component overall to form an energy efficient and stable modular buildings including energy efficient seams that provide for simultaneous alignment and friction-based locking of the panels at the joints; wherein the alignment and interconnection of the panels is provided in one embodiment by at least two mating vertically oriented rail systems that are connected to and protrude from and extend along the length of an edge of the wall panel body and wherein two wall panels are connectable by aligning the mating edges of the two panels and then interconnecting the rail systems, thereby providing the alignment and securement of the panels at those edges or seams formed at the joined edges of two panels.

In one embodiment, the at least two vertically oriented rails systems include spaced apart rails that matingly correspond to receptive cavities in the mating panel edge, so that when the two panels are aligned, connected and joined at these edges, the rail system provides for mating securement of the panels. Preferably, the corresponding edges include one edge with protruding rails and the opposite edge having cavities sized, shaped and configured for receiving the protruding rail system counterparts. In another embodiment, the rails on one edge are alternatingly spaced apart with the protruding rail having a mating receiving cavity disposed therebetween. In another embodiment, the rails are spaced apart with no cavity disposed therebetween, such that the seam is formed not by abutting wall panel bodies wherein the seam or joint exists at the direct connection of the panel edges, but that the seam is formed by interleaved protruding rails that form an aligned, friction-based locking of the joined wall panel bodies. In this way, the rails form interleaved laminae whose surface area of overlapping laminae create a seam, thus eliminating the need for sealing gaskets. The seam thickness may be equivalent to the wall panel body thickness, or it may be less than the thickness of the wall panel body; if the latter, then additional insulation, covering material, or tape is provided to ensure seam thickness consistency with the wall panel body.

In one embodiment, the overlapping laminae are substantially parallel, which allows for greater friction to be created due to the increased overlapping surface area as compared to laminae that are configured to be angled towards each other.

In one embodiment, the rail system is continuous. Alternatively, instead of or combined with at least one continuous protruding rail on an edge, the system includes discrete protruding tabs that are spaced apart along the length of the edge, and wherein corresponding cavities for receiving those protruding tabs are provided.

Preferably, the modular building system with prefabricated composite wall panels of the present invention may be constructed and configured to include conduits in the panel body with conduit input/output openings along predetermined edge areas of the panel body, and energy efficient seams or joints that provide for simultaneous alignment and friction-based locking of the panels at the joints.

Thus the present invention provides for energy efficient and stable modular building systems having energy efficient seams or joints that provide for simultaneous alignment and friction-based locking of the panels at the joints, without requiring any additional securement mechanism at the joints for ensuring stability of the connected panels at those joints or seams.

Preferably, the corner panel component is constructed and configured to form at least one "L-shaped" corner; however, multiple corners may be provided by a single corner panel component, including by way of example and not limitation, a "T" cross-section or a "+" cross-section, when viewed from the top. In preferred embodiments, the corner element is established within a single, integral and seamless modular panel having at least two wall panel body members extending outwardly therefrom for providing wall panel component intersections at edges from those at least two wall panel body extending outwardly from the corner element to form the corner panel component. By way of example, as illustrated in FIG. 5B, a "T" cross-section provides for two corners and three wall panel component intersections extending outwardly from the seamless corner edge; as illustrated in FIG. 5C, a "+" cross-section provides for four corners and four wall panel components extending outwardly from the corner element, each wall panel having one edge at a spaced apart distance from the corner element, wherein at those edges, other wall components may be connected thereto for forming a seam and extending the length of the wall region formed by the connection of multiple wall panel components.

Figure 5:
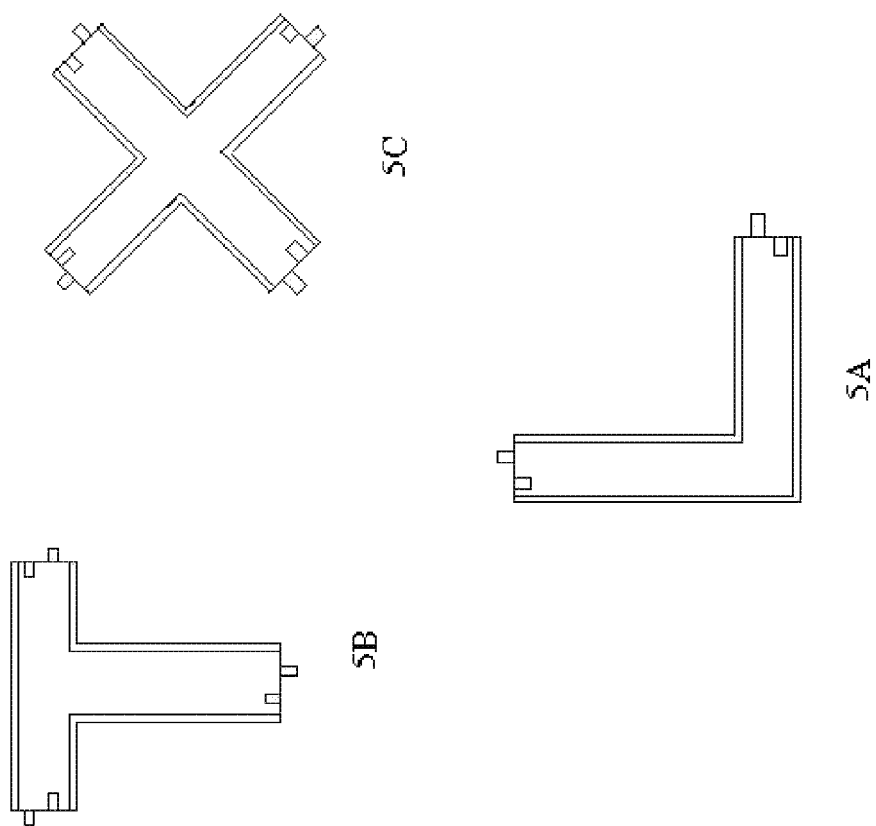

As illustrated in FIG. 5A, the corner modular components include a corner element positioned between and formed by two body sections having edges spaced apart at least about one foot from the corner element. Preferably, the corner element forms an angle of between about 45 and about 135 degrees, more preferably about 90 degrees. However, other angles are optionally provided, depending upon the desired building configuration.

More preferably, the corner panels as set forth hereinabove are provided as a unitary, integral single molded panel component, including the corner(s). Also, by providing one or more extended segments from at least one corner in a unitary, integral single molded panel component, it correspondingly provides for a multiplicity of panel configurations with corner(s).

Figure 2:
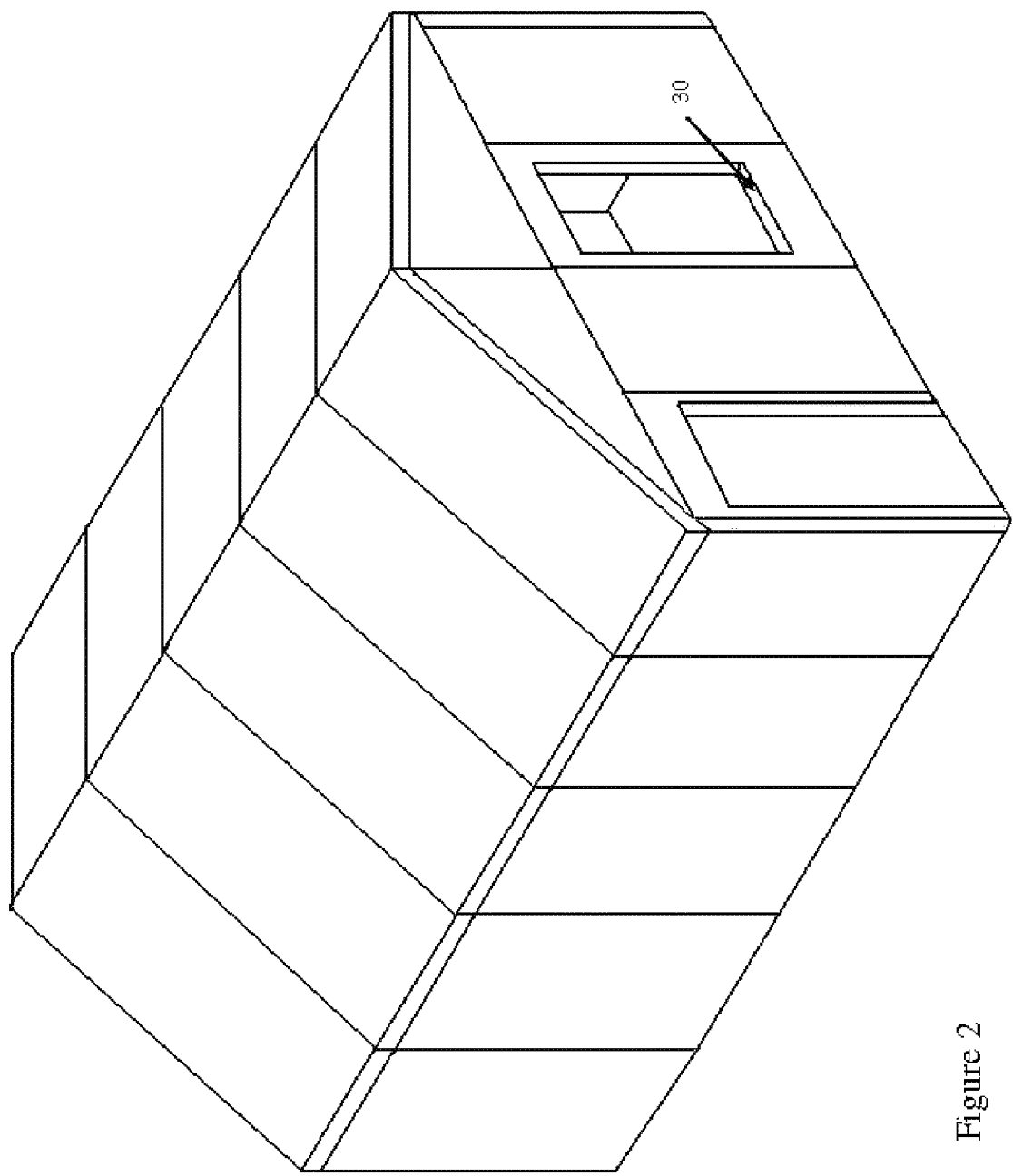
Figure 3:
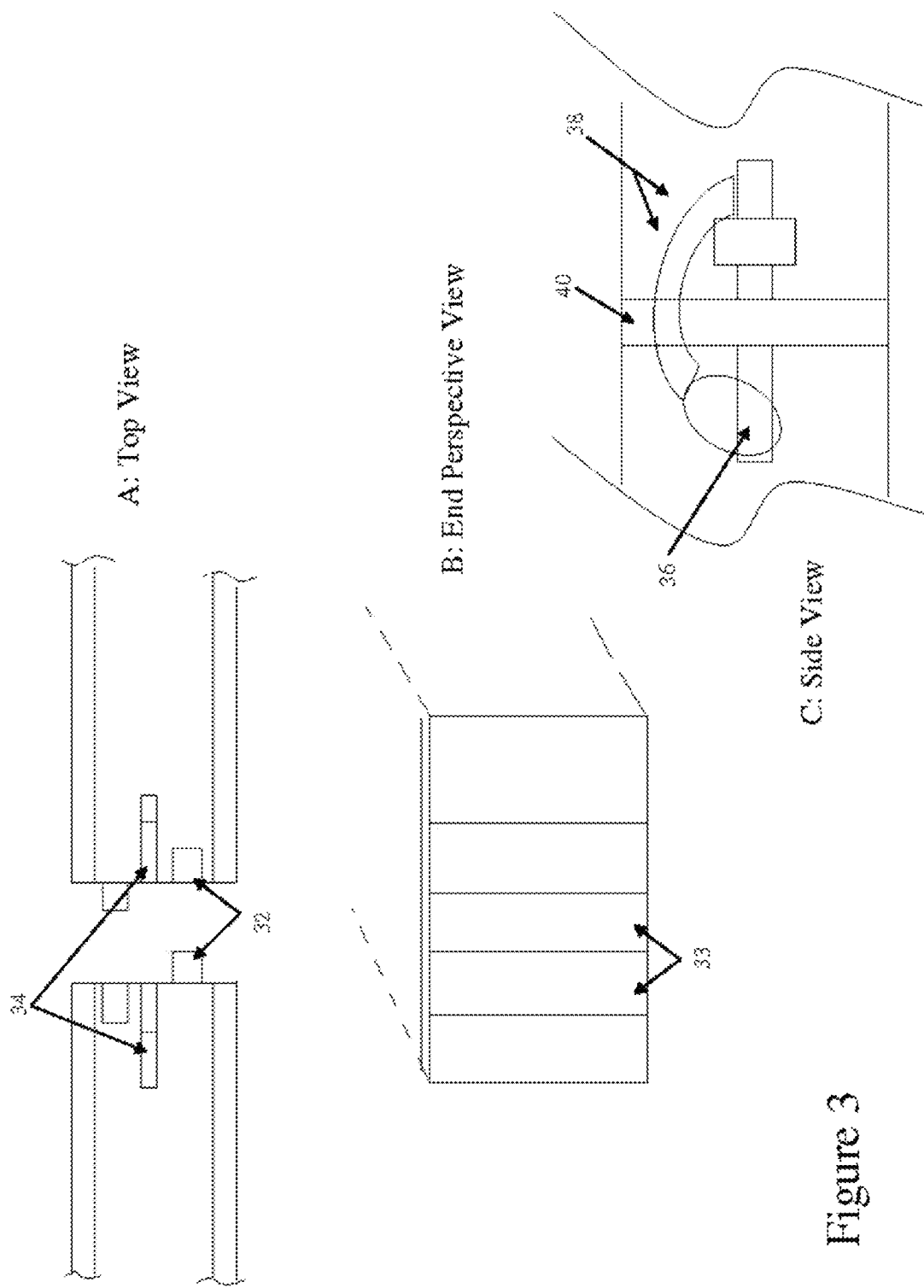

Referring now to the drawings overall, FIG. 1 illustrates a perspective view of a partially assembled modular building structure 1180, including door component 28, wall panel edges 20, 22, wall panel face side 16, and back side 18, wall panel (generally referenced 14), joined edges or seam 24, roof panel 26. FIG. 2 shows a perspective view of a completed modular building from the partially completed illustration of FIG. 1 including a window unit 30. FIG. 3 illustrates several related views; in FIG. 3A a top view of two edges of modular wall panels having mating double railing 32 for alignment and locking mechanism 34; FIG. 3B illustrates an end perspective view illustrating the parallel spaced apart double track or railing system 33; FIG. 3C illustrates a side view and cut-away of joined panel edges with the interlocking cam-based locking mechanism (cam 36, locking arm 38, seam 40). In one embodiment of the invention, the spaced apart rail system is best described as an double alternate tongue and groove system, where two tongue and groove system are spaced apart and have opposite configurations. In such an embodiment, one panel edge would have both a male and a female line in parallel. This opposing configuration ensures that the panels are aligned and positioned correctly due to the fact that if the panel turned around, the male and female edges would not align. Further, this embodiment creates a flush alignment of the two edges, restricting air and moisture flow between the barriers. Lastly this embodiment optionally requires reinforcement along the tongues to ensure durability and strength of these tongues—the strength of the interior of the panel being enhanced by a metal casing, for example.

Figure 4:
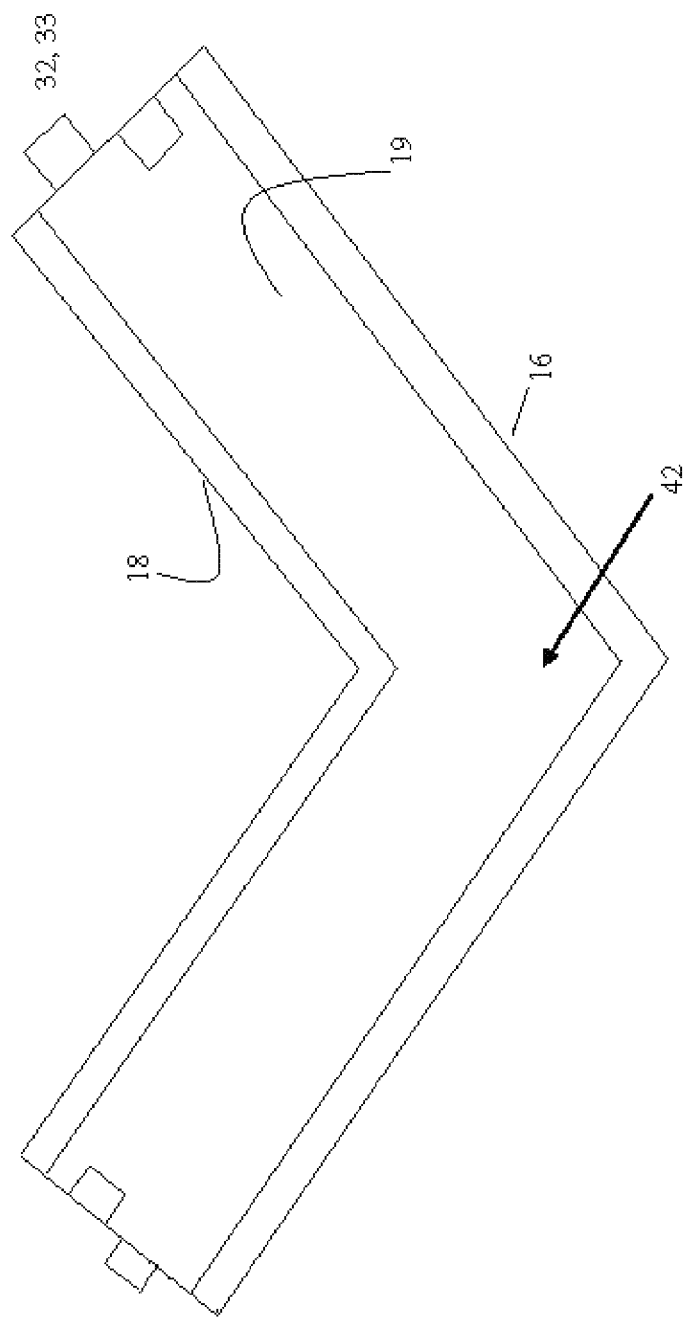

FIG. 4 illustrates a top view of a corner wall panel modular component with seamless corner 42 with insulation 19 a face side 16 and back side 18 of the wall panel, and double rail mating alignment components 32, 33.

FIG. 5A illustrates a top view of a corner wall panel modular component with seamless corner and two wall component segments extending outwardly therefrom. FIG. 5B illustrates a "T" cross-section a top view of a corner wall panel modular component with seamless corner and three wall component segments extending outwardly therefrom. FIG. 5C illustrates a "+" cross-section a top view of a corner wall panel modular component with seamless corner and four wall component segments extending outwardly therefrom. By way of more detailed description, FIG. 5A illustrates a top view of a corner wall panel modular component with seamless corner 42 with insulation 19 a face side 16 and back side 18 of the wall panel, and double rail mating alignment components 32, 33. Similarly, FIG. 5B illustrates a "T" cross-section and FIG. 5C illustrates a "+" cross-section a top view, respectively, of a corner wall panel modular component with seamless corner and four wall component segments extending outwardly therefrom.

Figure 6:
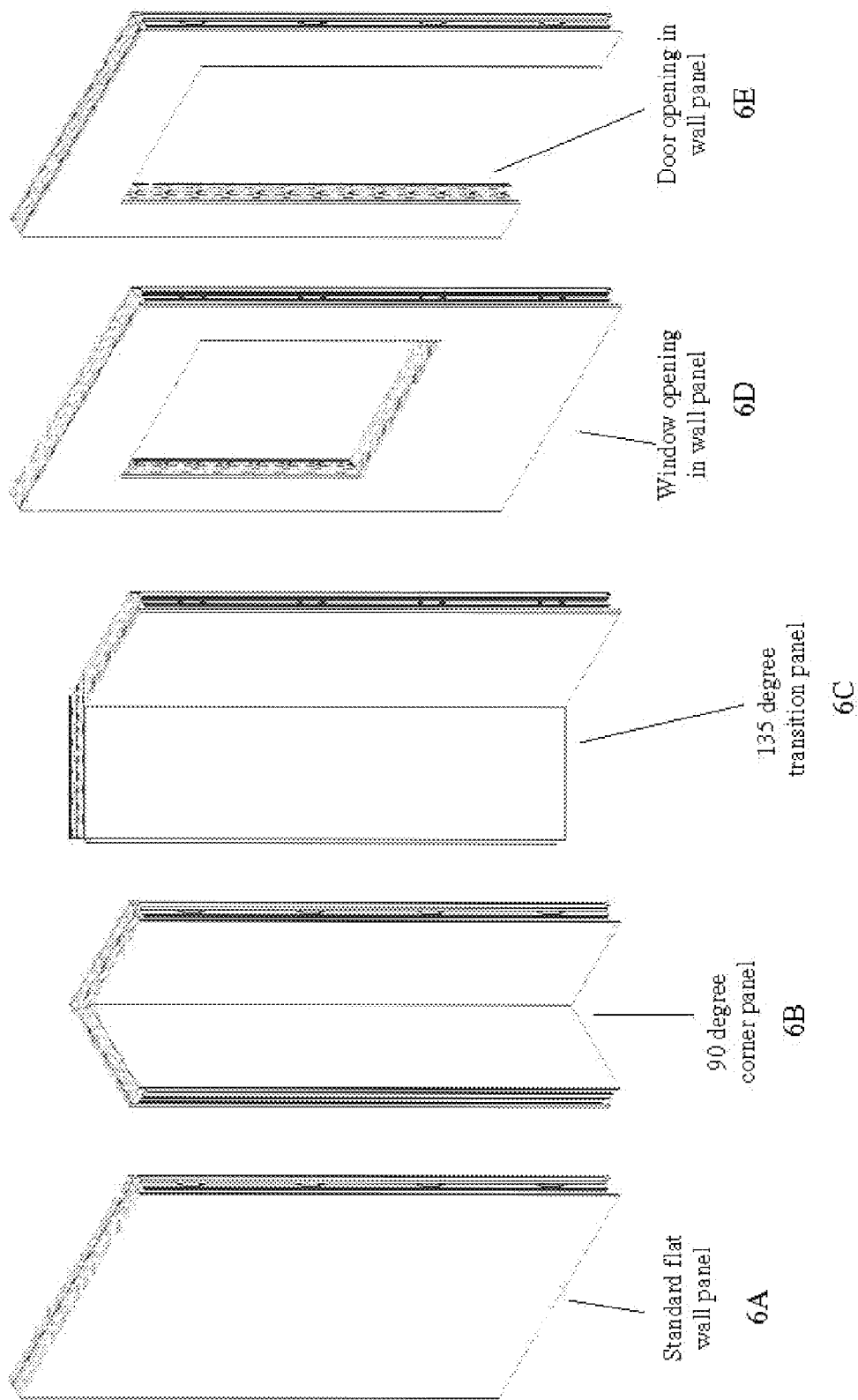

FIG. 6 illustrates several perspective views of the modular building components including FIG. 6A showing a basic flat wall panel component; FIG. 6B showing a 90 degree corner panel component; FIG. 6C showing a 135 degree angle corner panel or transition panel; FIG. 6D showing a window opening in a wall panel component; FIG. 6E showing a door opening in a wall panel component.

Figure 7:
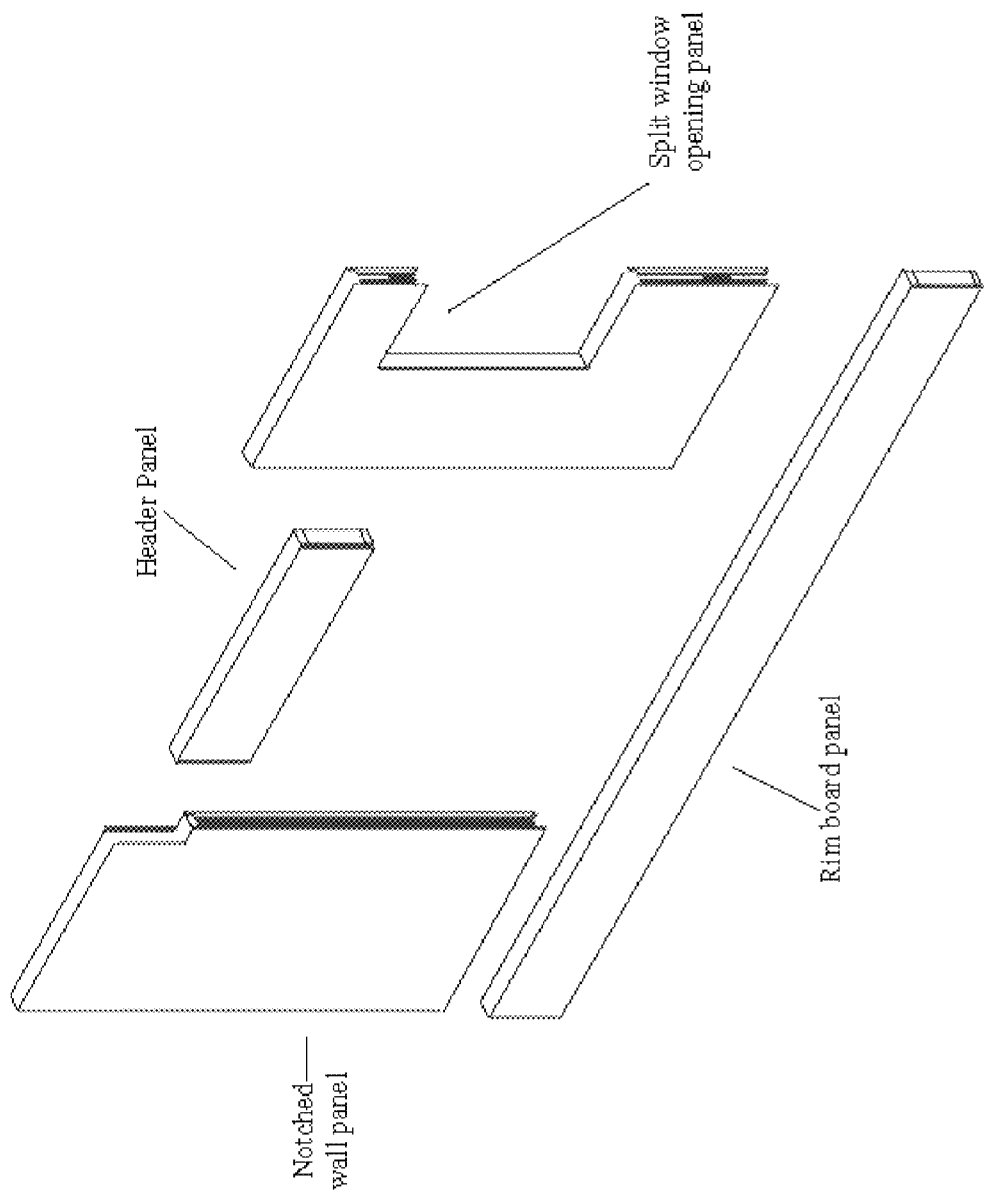
Figure 8:
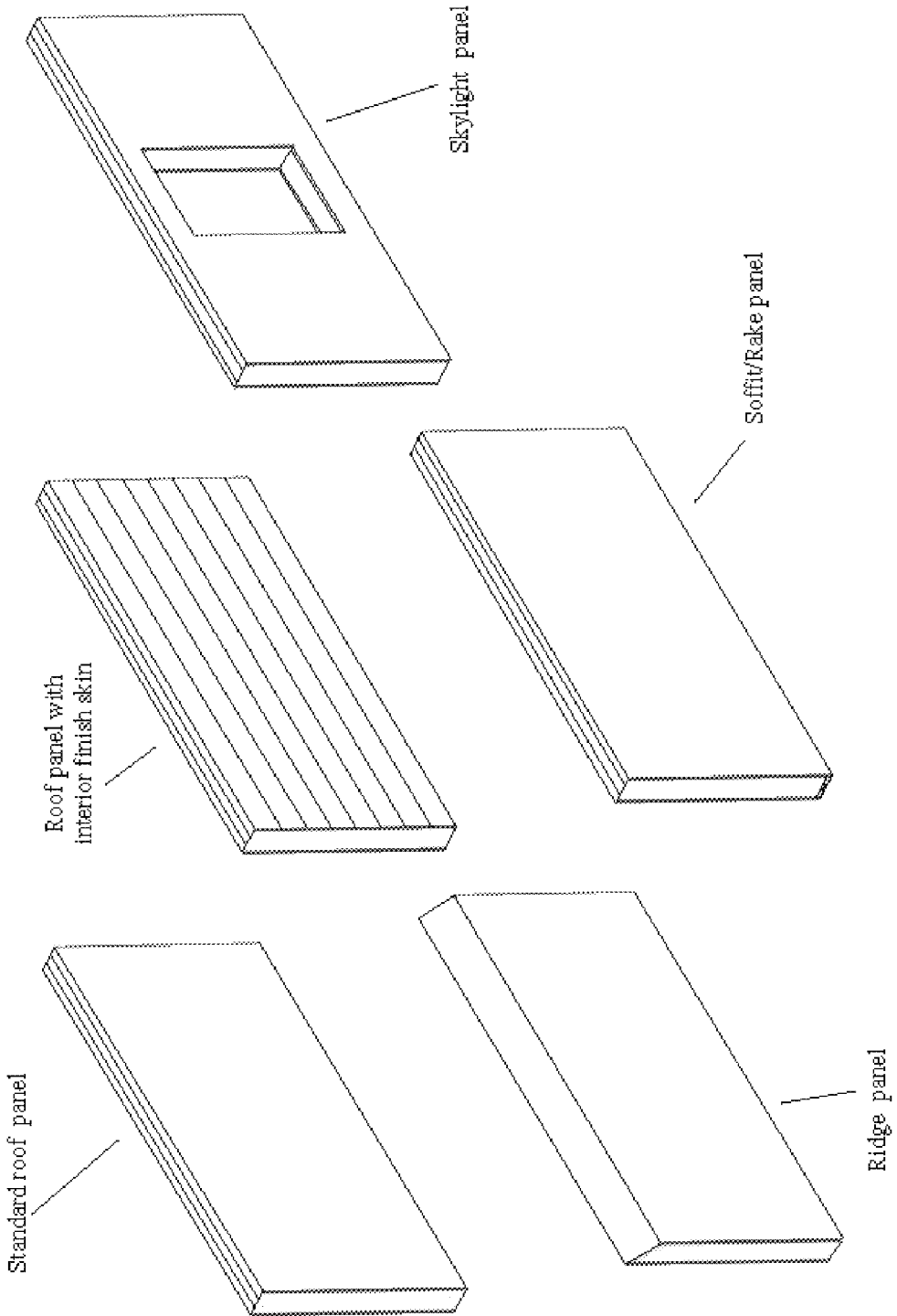
Figure 9:
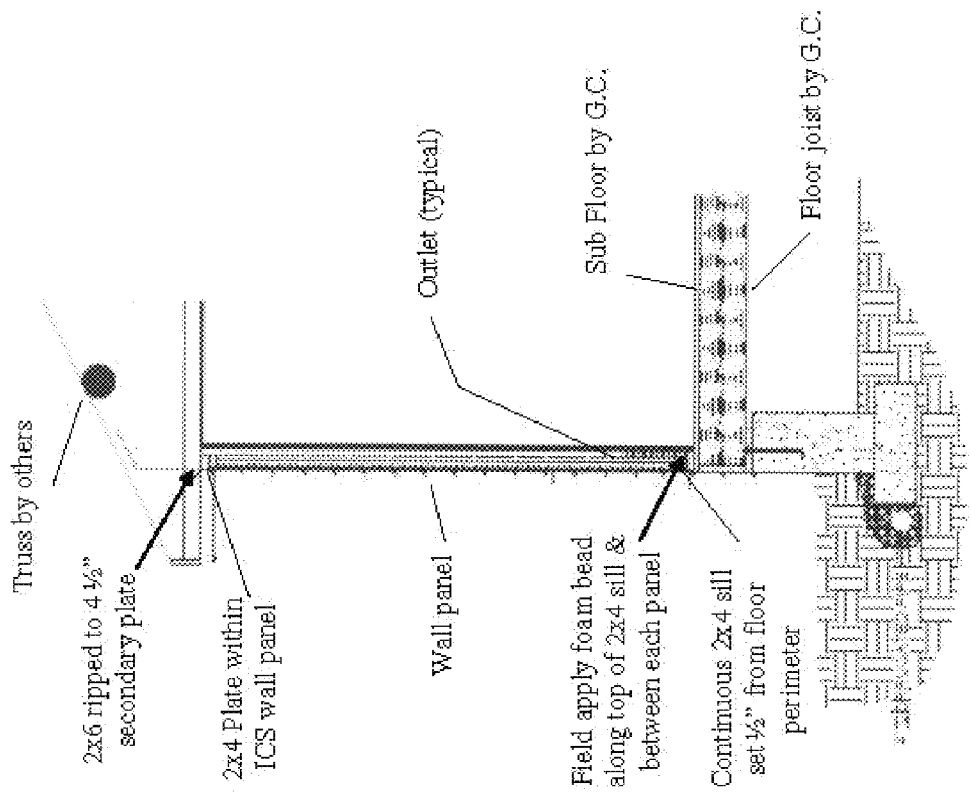

FIG. 7 illustrates an exploded view of various component panels. FIG. 8 illustrates various component roof panels. FIG. 9 illustrates a cut-away partial side view of a wall panel installation according to one aspect of the present invention.

Figure 10:
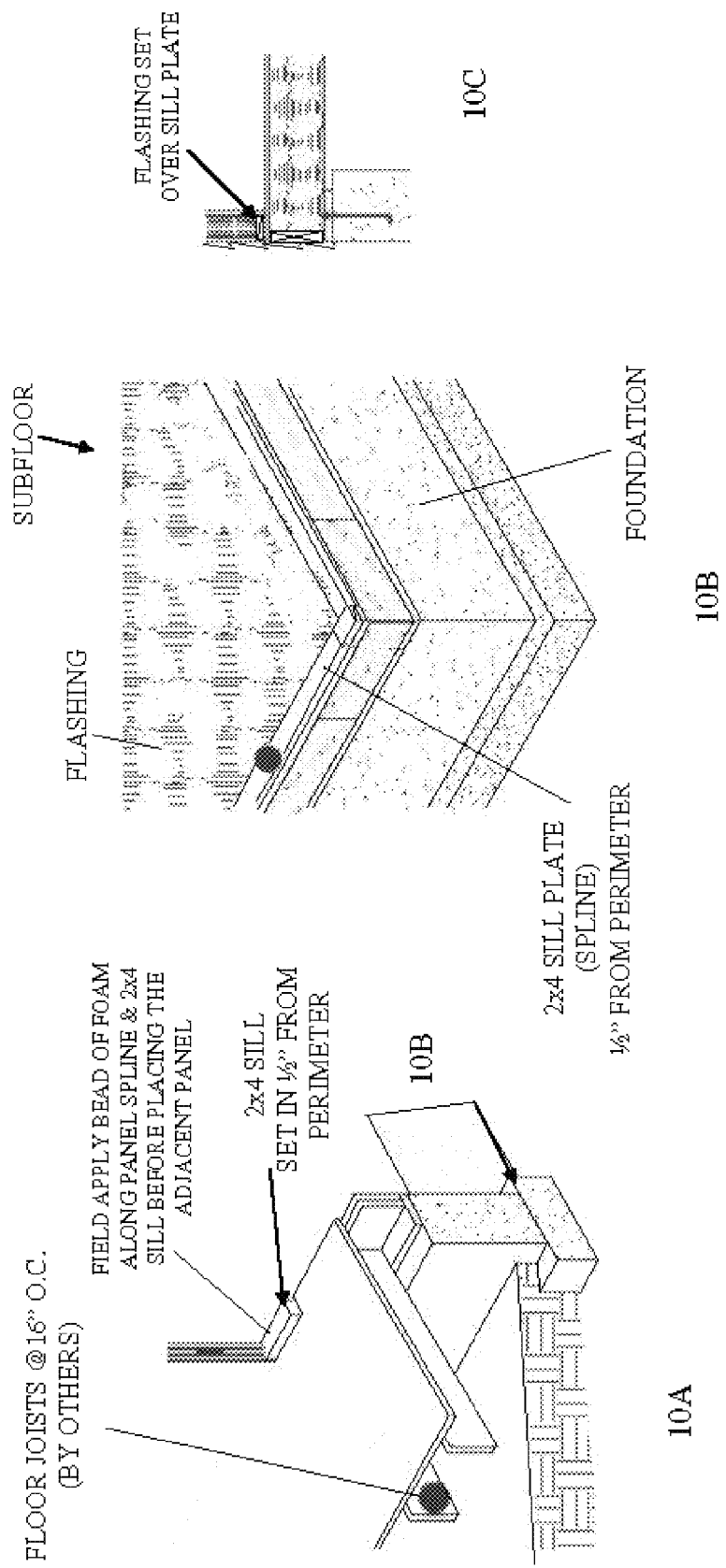

FIG. 10A illustrates a cut-away partial perspective view of a wall panel installation according to one aspect of the present invention; FIG. 10B illustrates a partial perspective view of a section of FIG. 10A; FIG. 10C shows a cut-away side view of a section of FIG. 10A.

Figure 11:
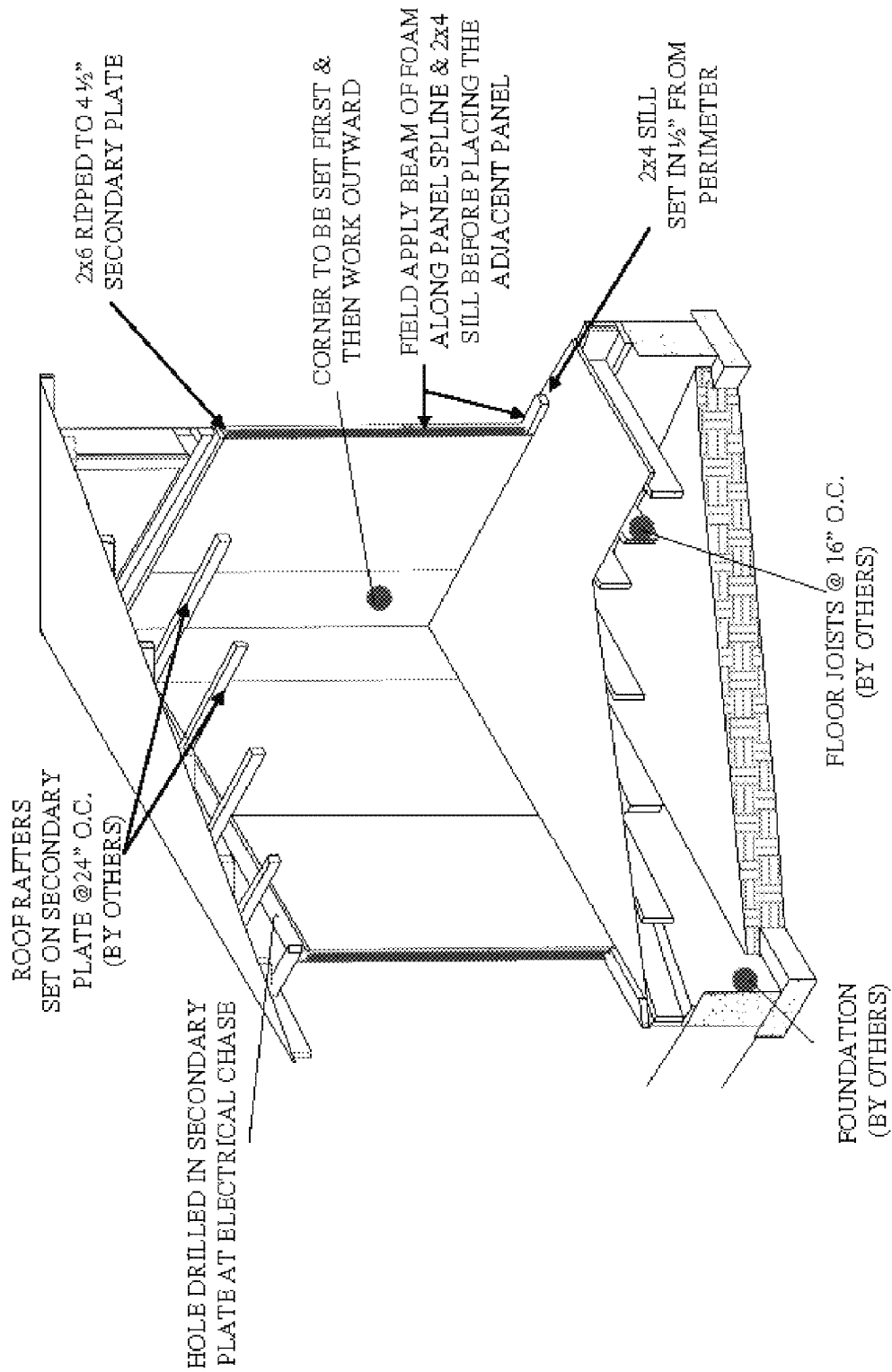

FIG. 11 illustrates a cut-away partial perspective view of a wall panel installation according to one aspect of the present invention.

Figure 12:
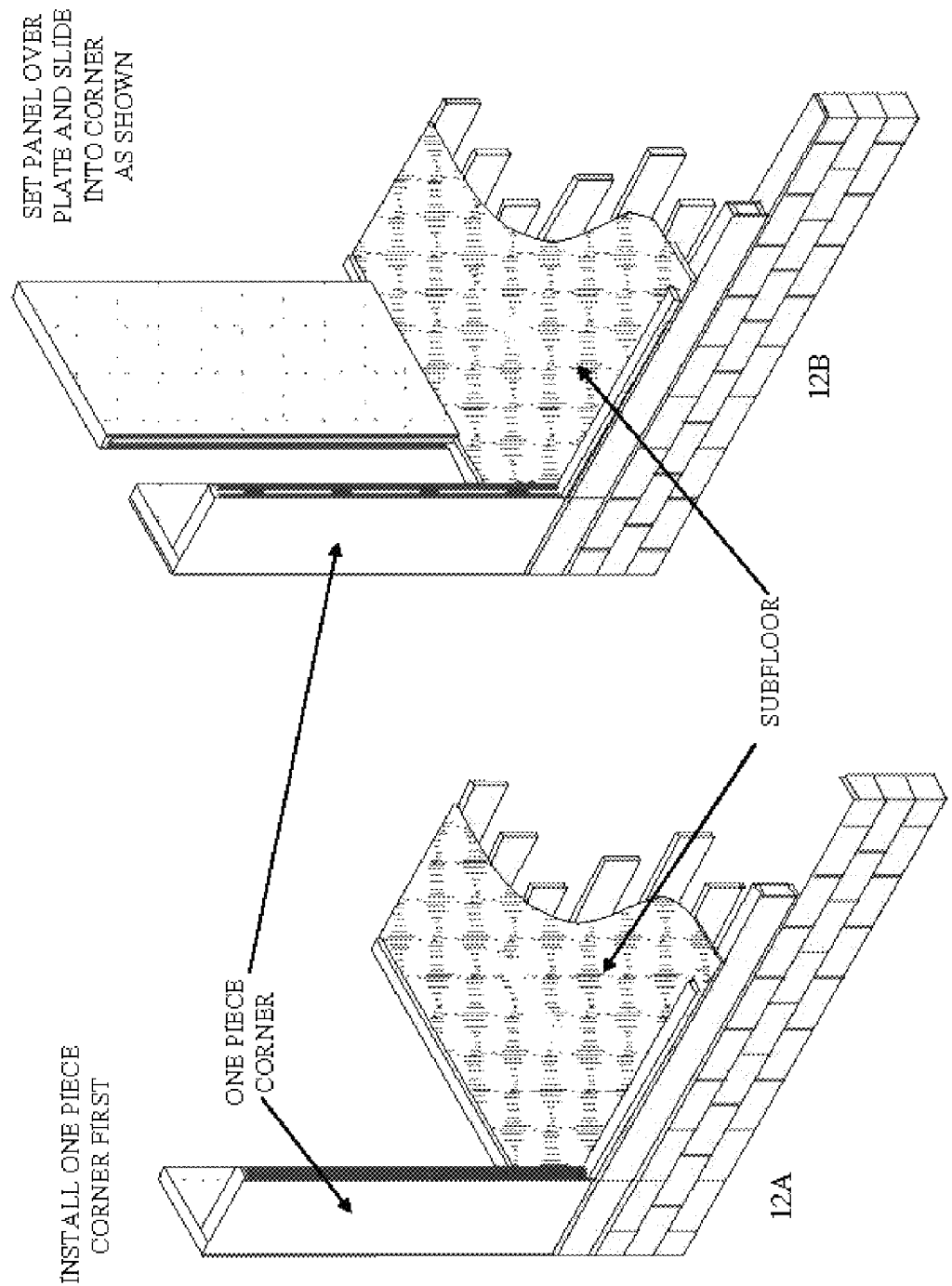
Figure 13:
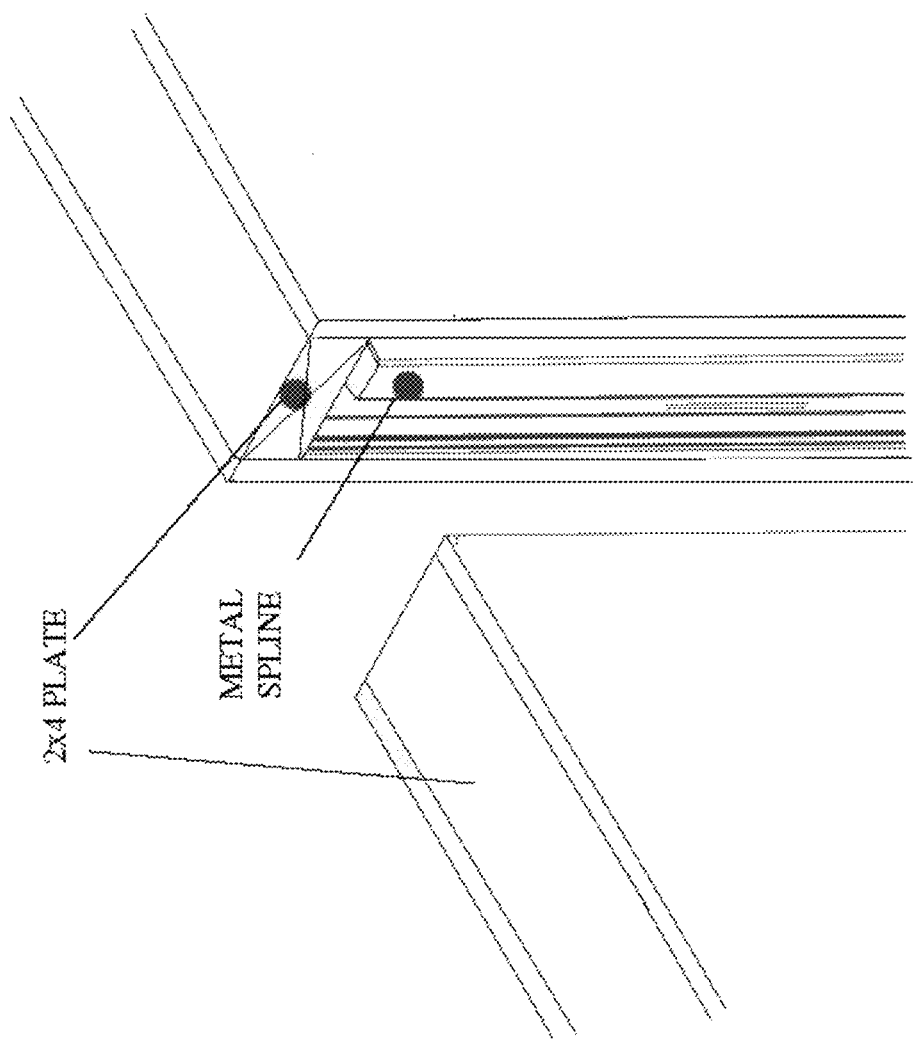
Figure 14:
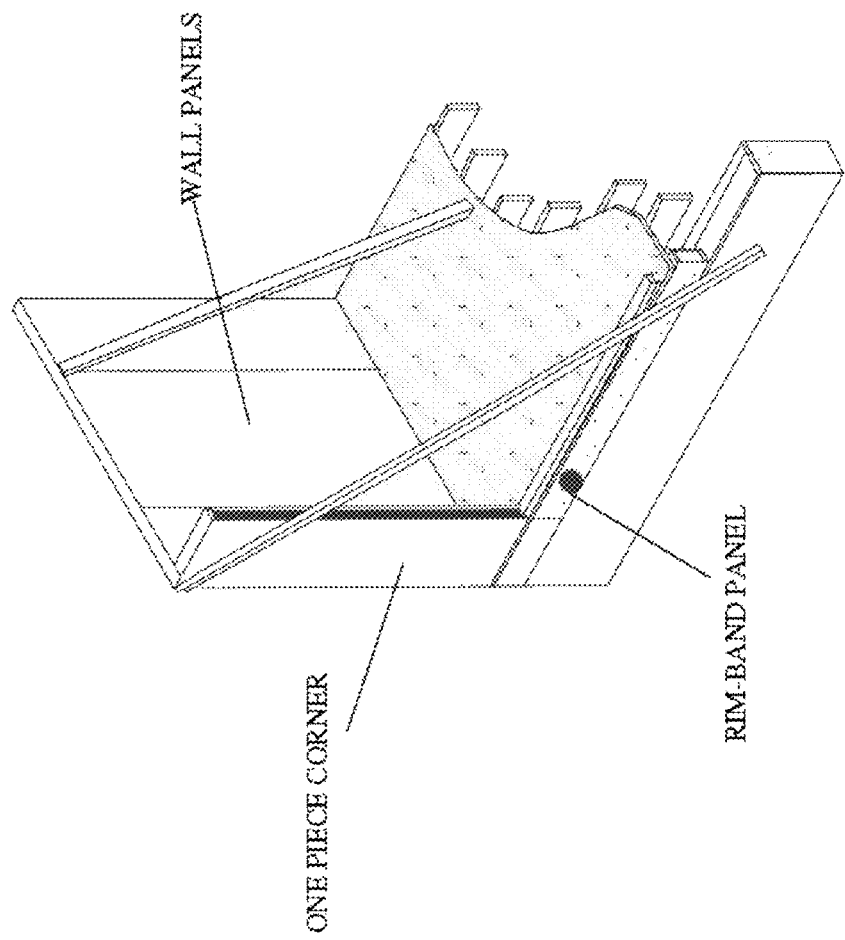

FIG. 12 illustrates a cut-away partial perspective view of a wall panel installation according to one aspect of the present invention, including two stages of corner panel installation, 12A and 12B. FIG. 13 illustrates a cut-away partial perspective view of a wall panel installation of two components constructed and configured for connection following the step illustrated in FIG. 12B. FIG. 14 illustrates a cut-away partial perspective view of a wall panel installation according to one aspect of the present invention, including a unitary and integral single component seamless corner panel and wall panel components connected thereto.

The present invention provides for systems and methods for a modular building having structural prefabricated wall panel components that are juxtapositioned, aligned and interconnected along their edges to form joints or seams, wherein the wall components are assembled and locked in place to form an energy efficient and stable modular building including energy efficient seams that provide for simultaneous alignment and friction-based locking of the panels at the joints; wherein the alignment and interconnection of the panels is provided by at least two mating vertically oriented rail systems that are connected to and protrude from and extend along the length of an edge of the wall panel body and wherein two wall panels are connectable by aligning the mating edges of the two panels and then interconnecting the rail systems, thereby providing the alignment and securement of the panels at those edges or seams formed at the joined edges of two panels.

FIG. 14 illustrates a cut-away partial perspective view of a wall panel installation according to one aspect of the present invention, including a unitary and integral single component seamless corner panel and wall panel components connected thereto.

Figure 15:
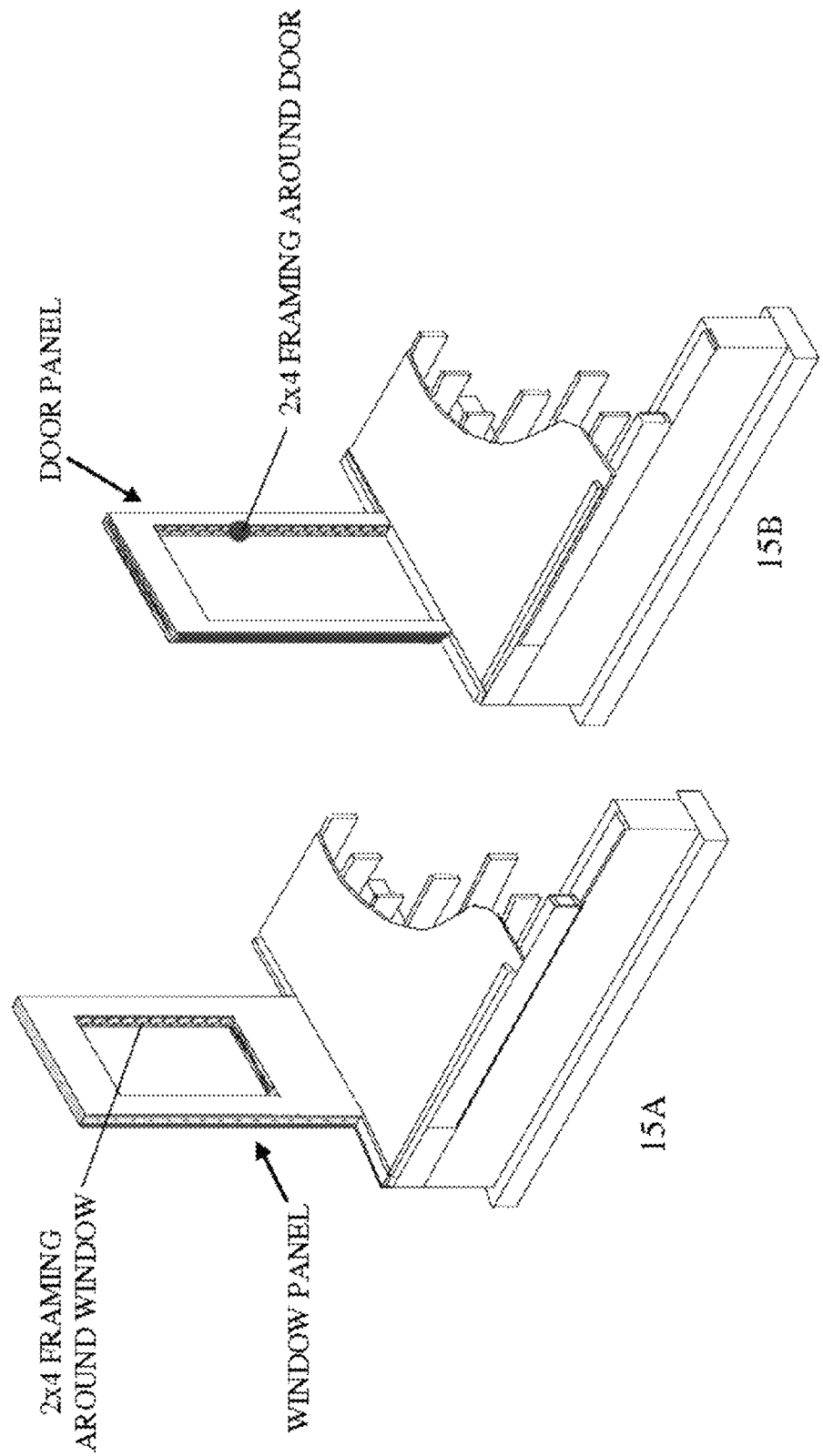
Figure 16:
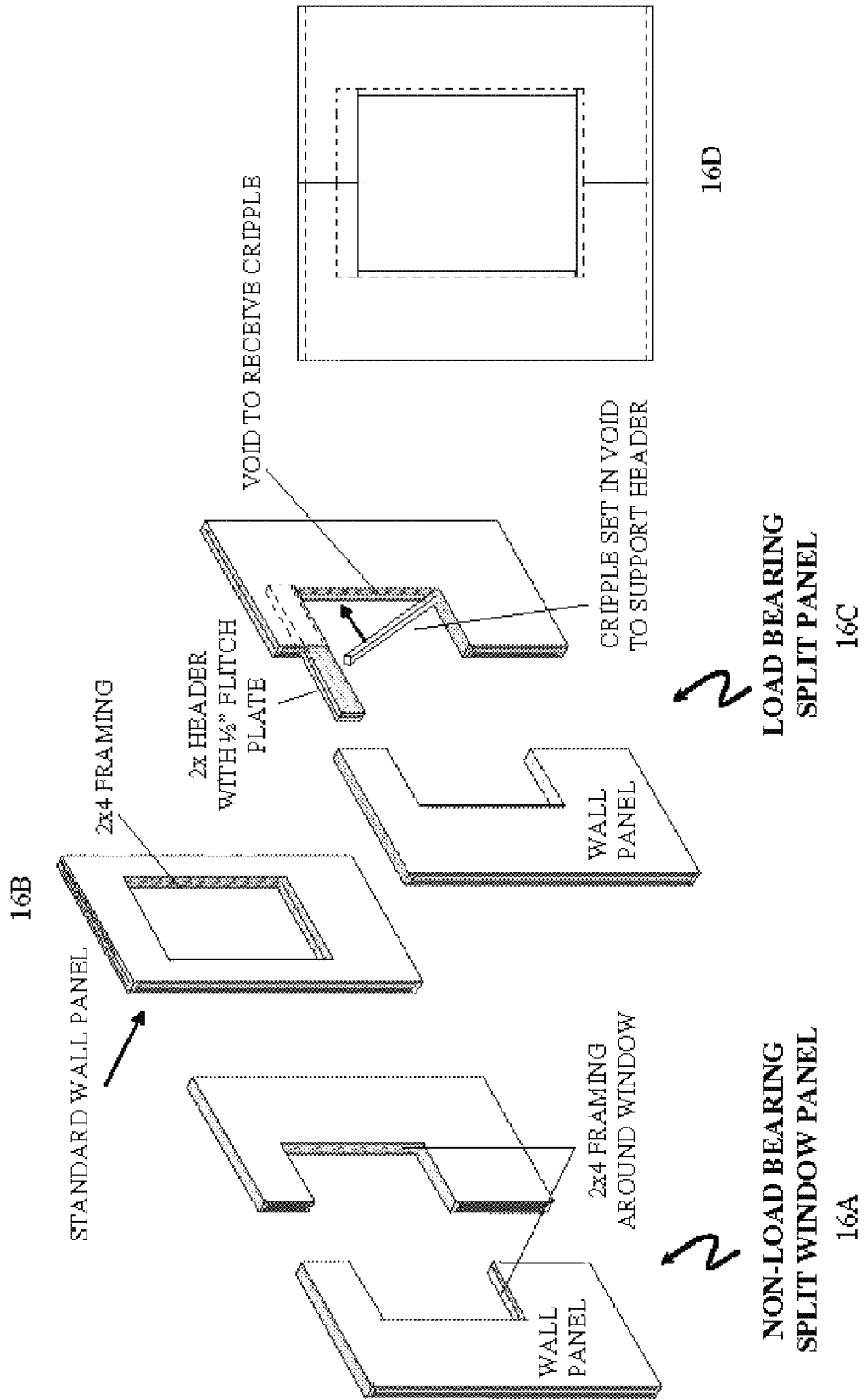

FIG. 15A and FIG. 15B illustrate a cut-away partial perspective view of a wall panel installation according to one aspect of the present invention with a window panel and door panel, respectively. FIG. 16A illustrates a cut-away partial perspective view of a wall panel for a non-load bearing split window panel; FIG. 16B illustrates a standard wall panel with window section (non-split); FIG. 16C illustrates a cut-away partial perspective view of a wall panel for a load bearing split window panel; FIG. 16D illustrates a front view of FIG. 16C components when assembled.

Figure 17:
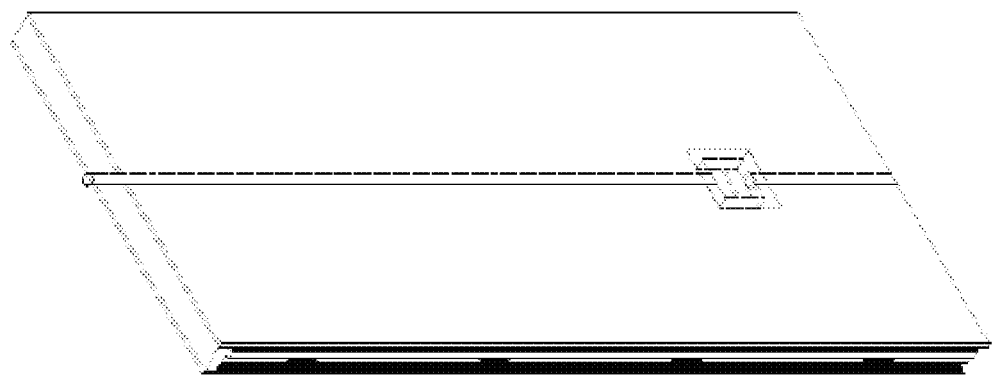
Figure 18:
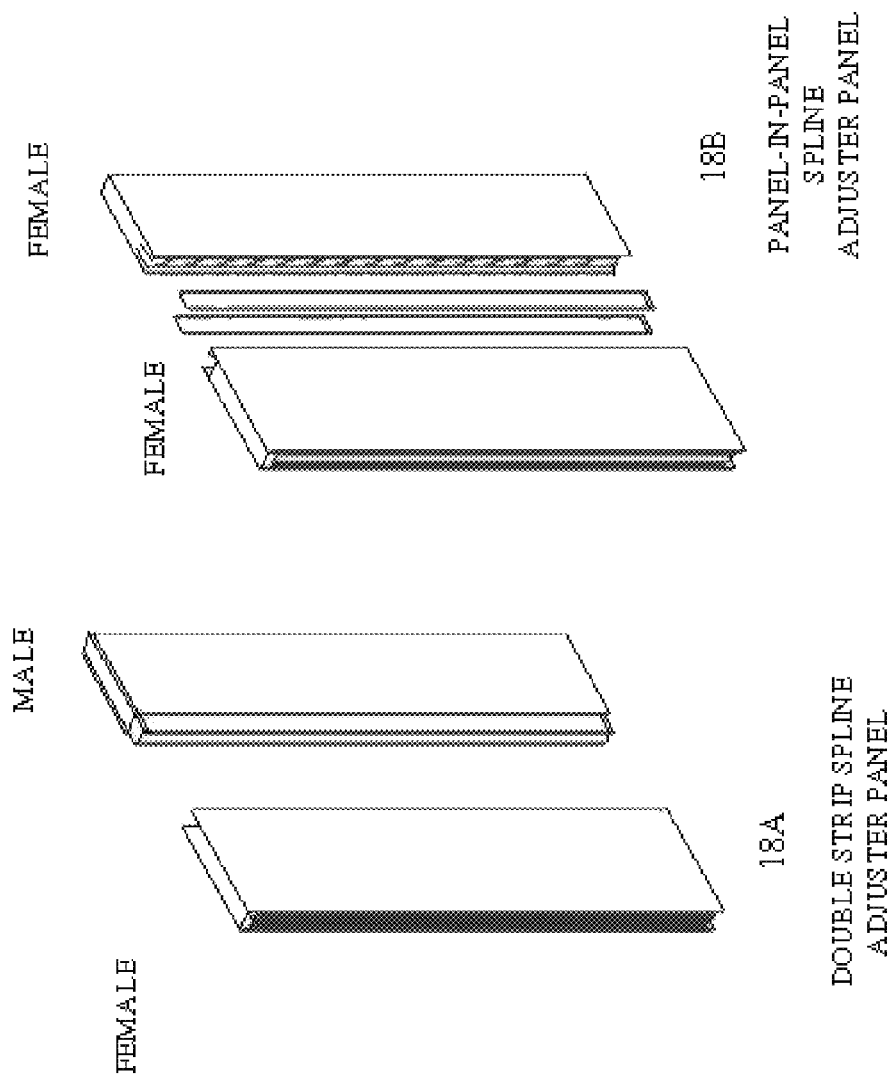
Figure 19:
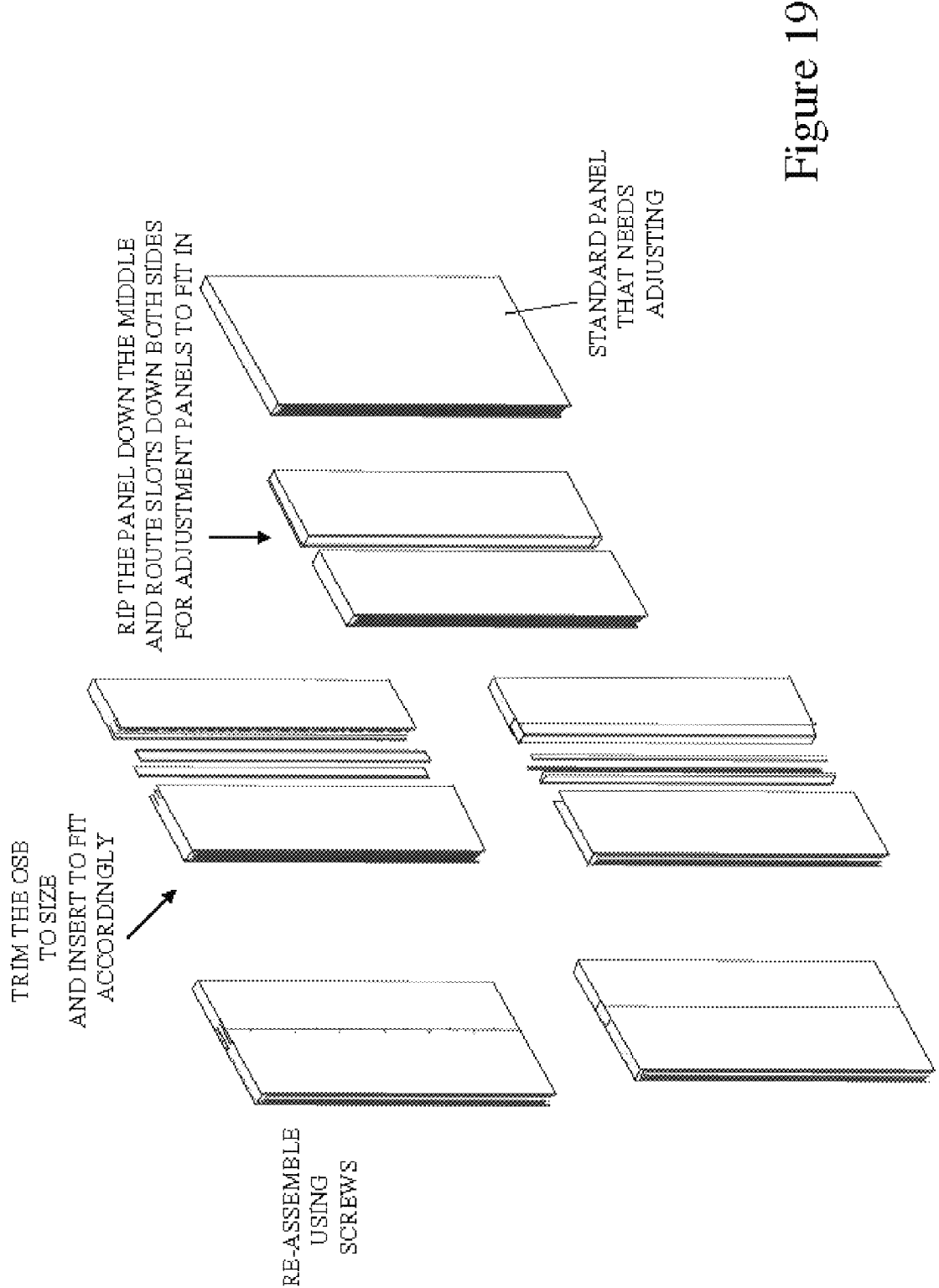
Figure 20:
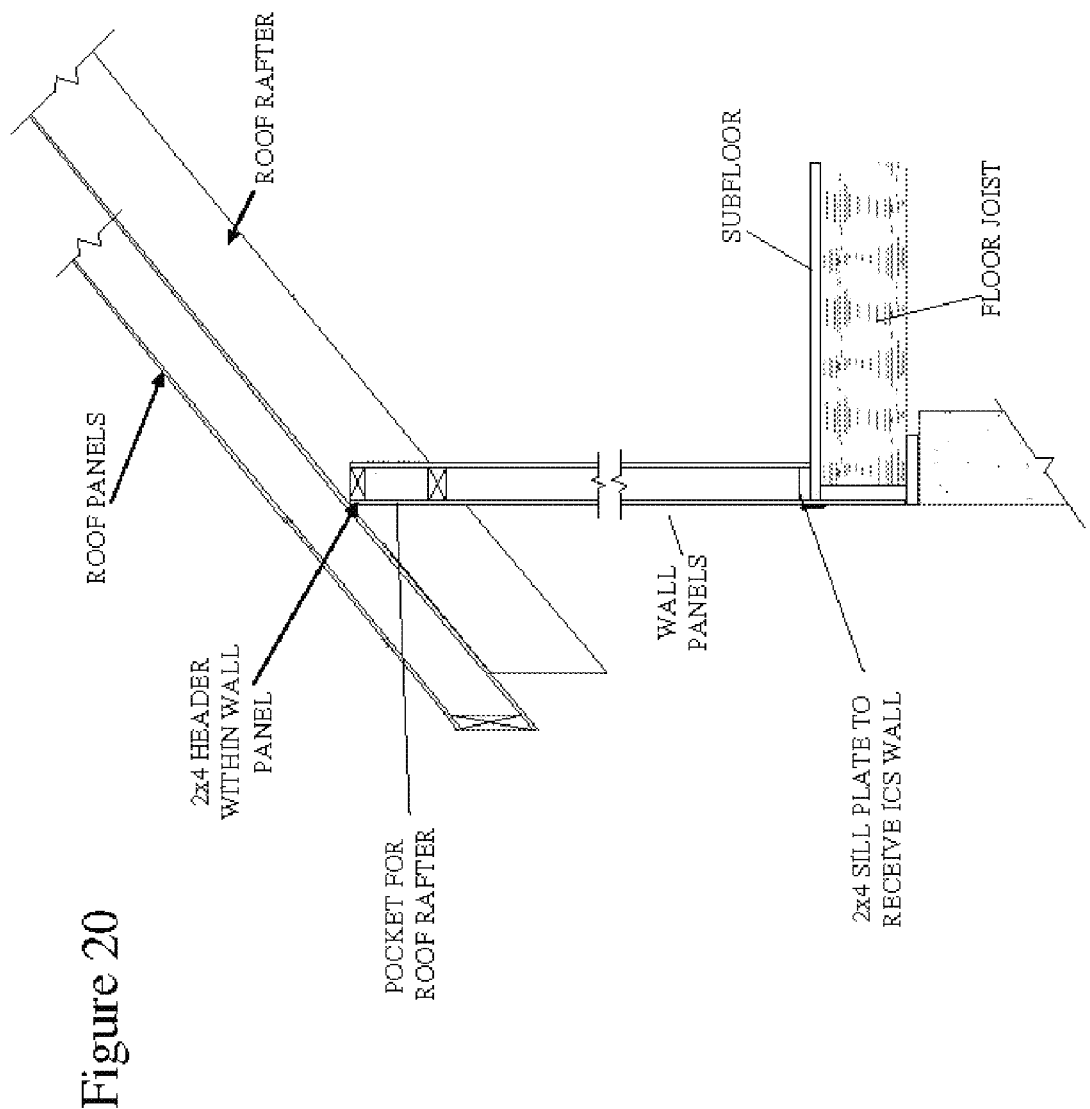
Figure 21:
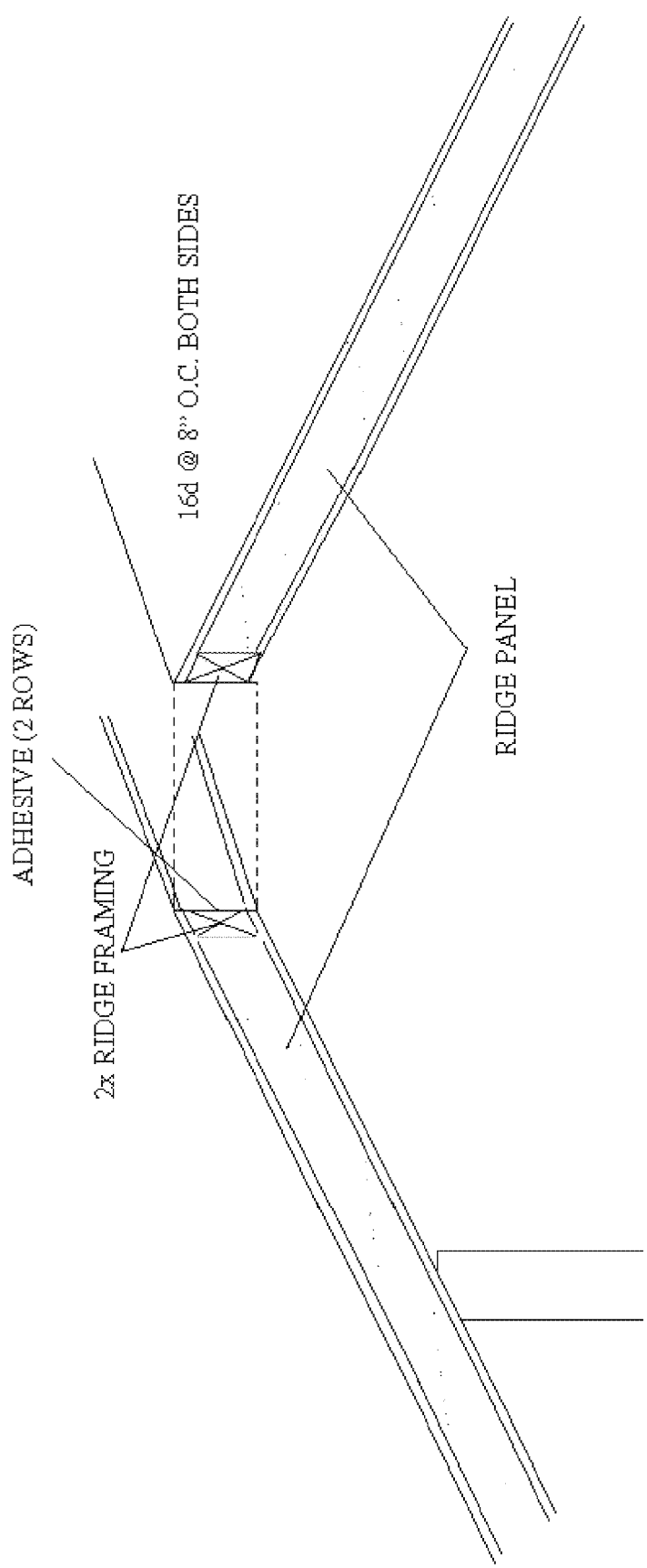
Figure 22:
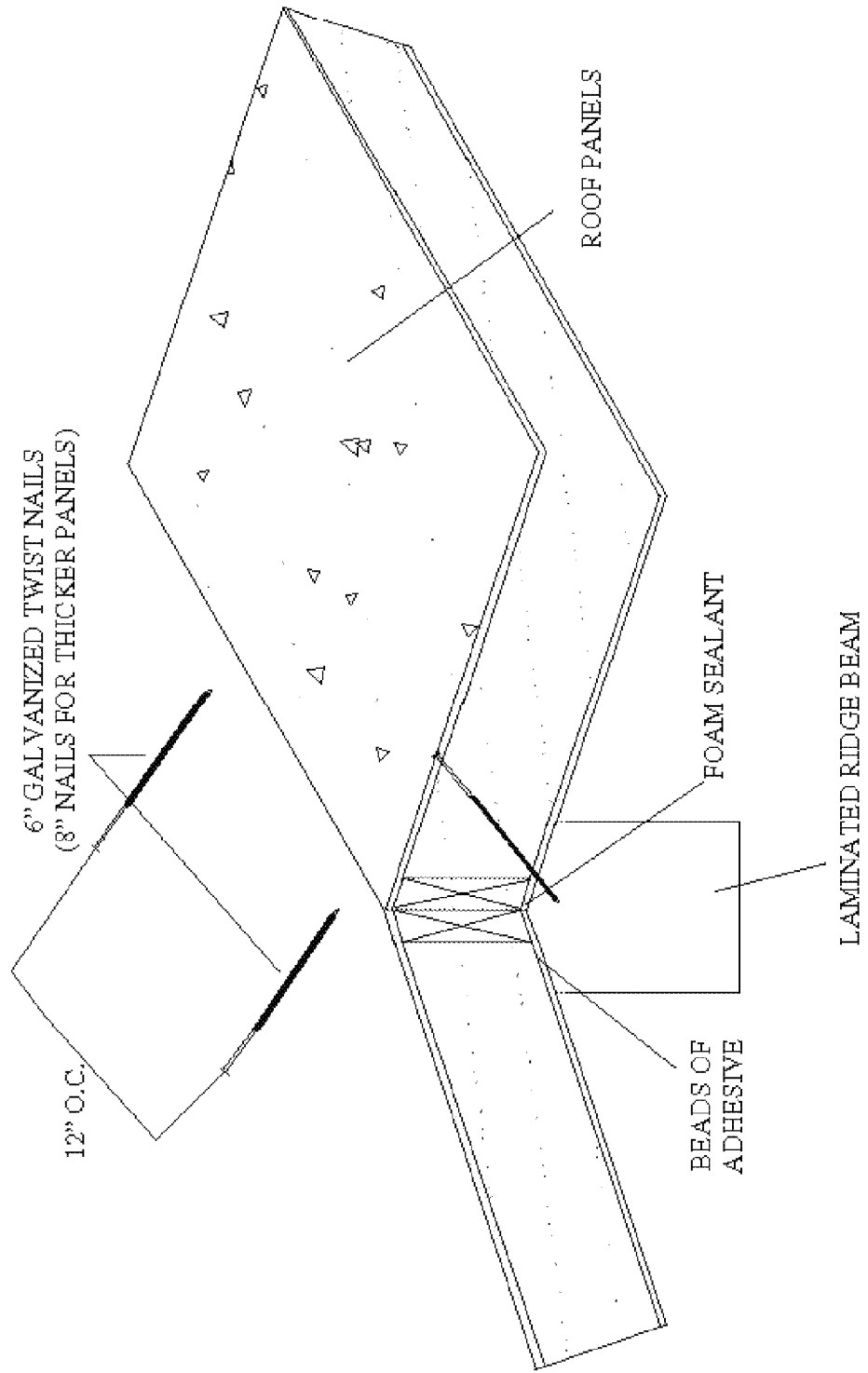
Figure 23:
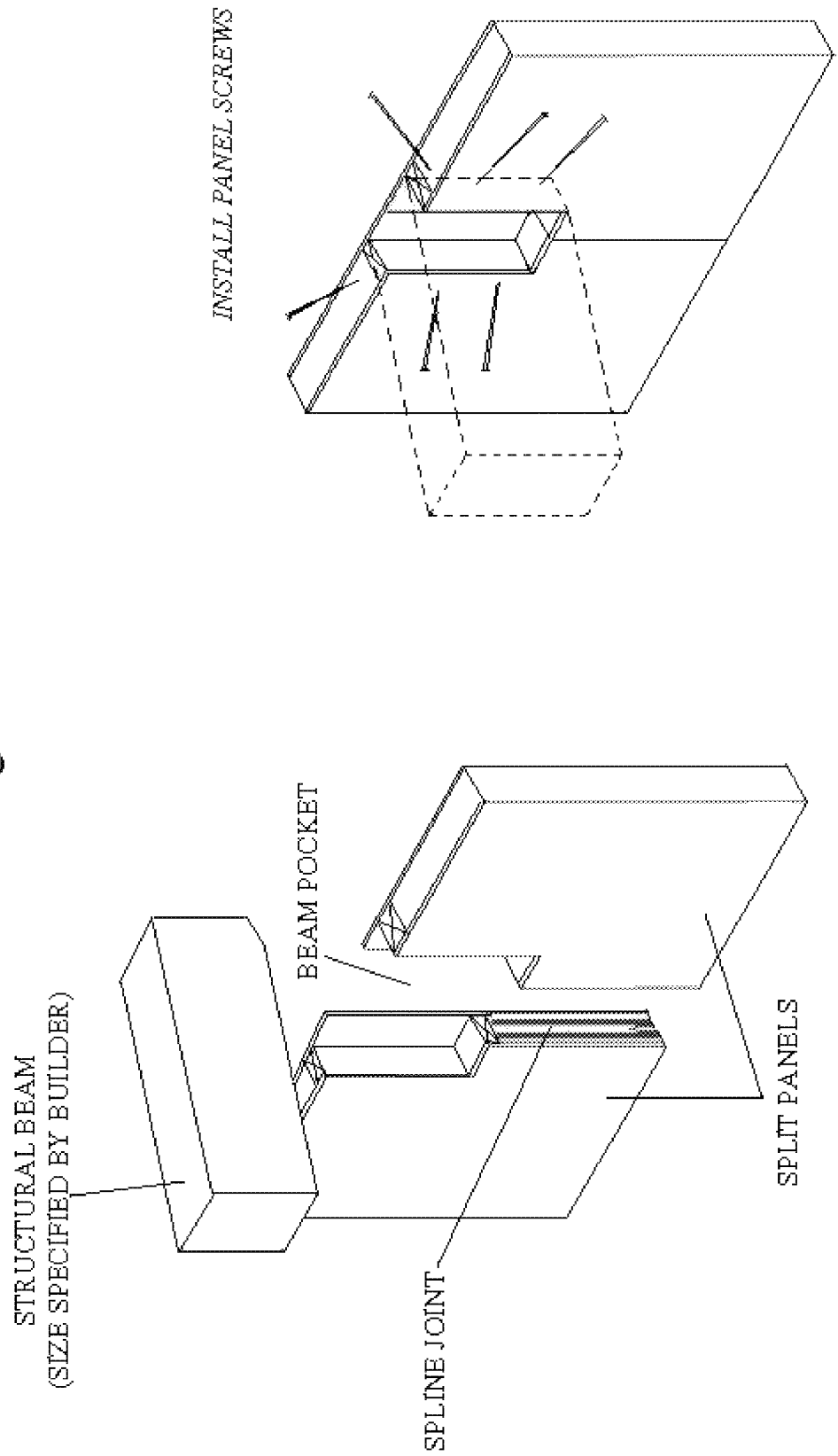
Figure 24:
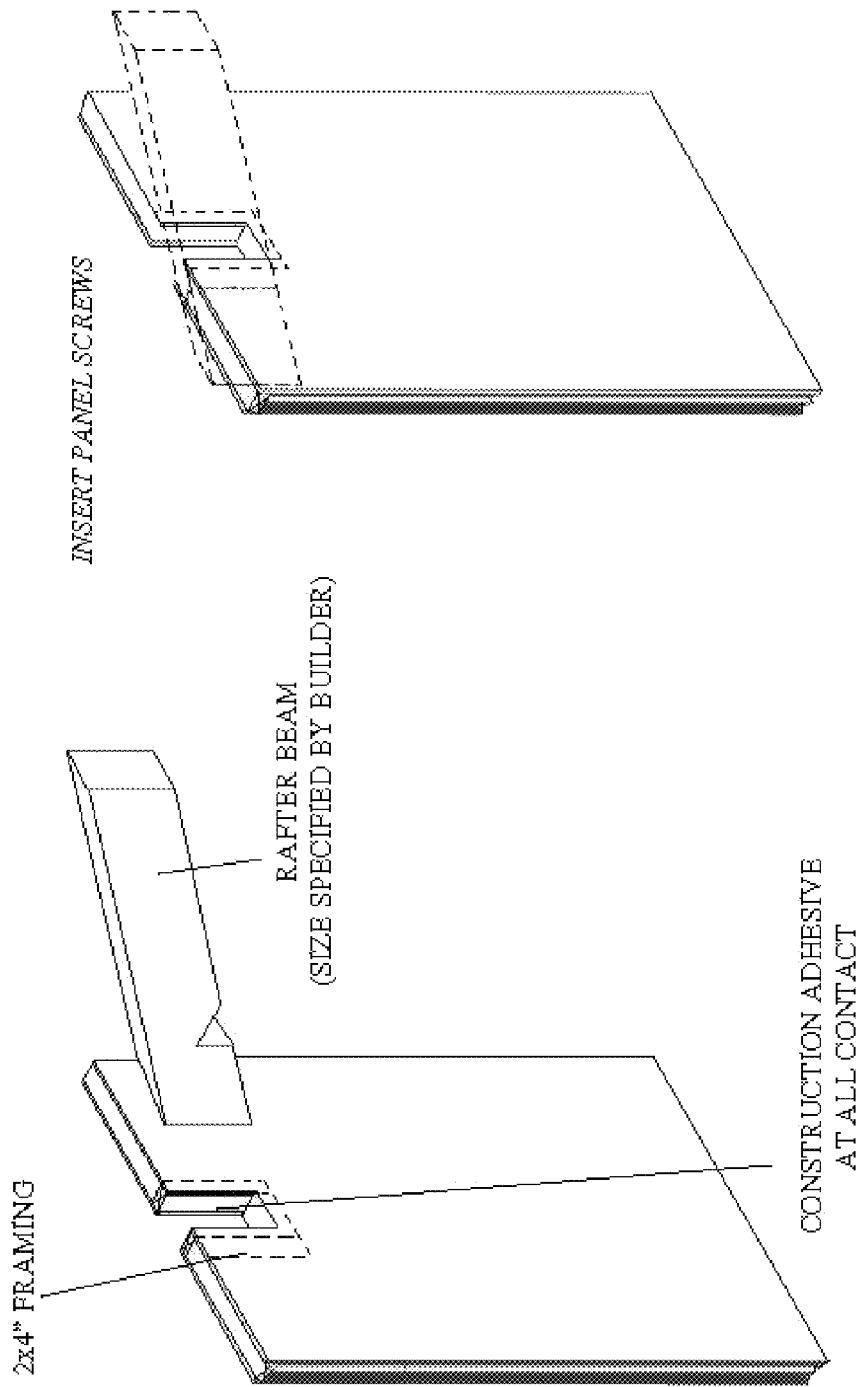

FIG. 17 illustrates a partial perspective view of wall panel components when assembled at a seam. FIG. 18A illustrates a perspective view of an adjuster panel with asymmetrically mating seams (male and female mating seams); FIG. 18B illustrates a perspective view of an adjuster panel with symmetrical mating seams (female-female with double strip spline connector) and connector. FIG. 19 illustrates components and steps for reassembly. FIG. 20 illustrates a cut-away partial front view of an assembly including components of the present invention. FIG. 21 illustrates a cut-away partial front view of a ridge panel for roof installation. FIG. 22 illustrates a cut-away partial perspective view of a roof installation including panels. FIG. 23 illustrates components and steps for assembly of split panels having beam pockets as shown assembled in FIG. 17. FIG. 24 illustrates another embodiment of components and steps for assembly of split panels having beam pockets.

Figure 25:
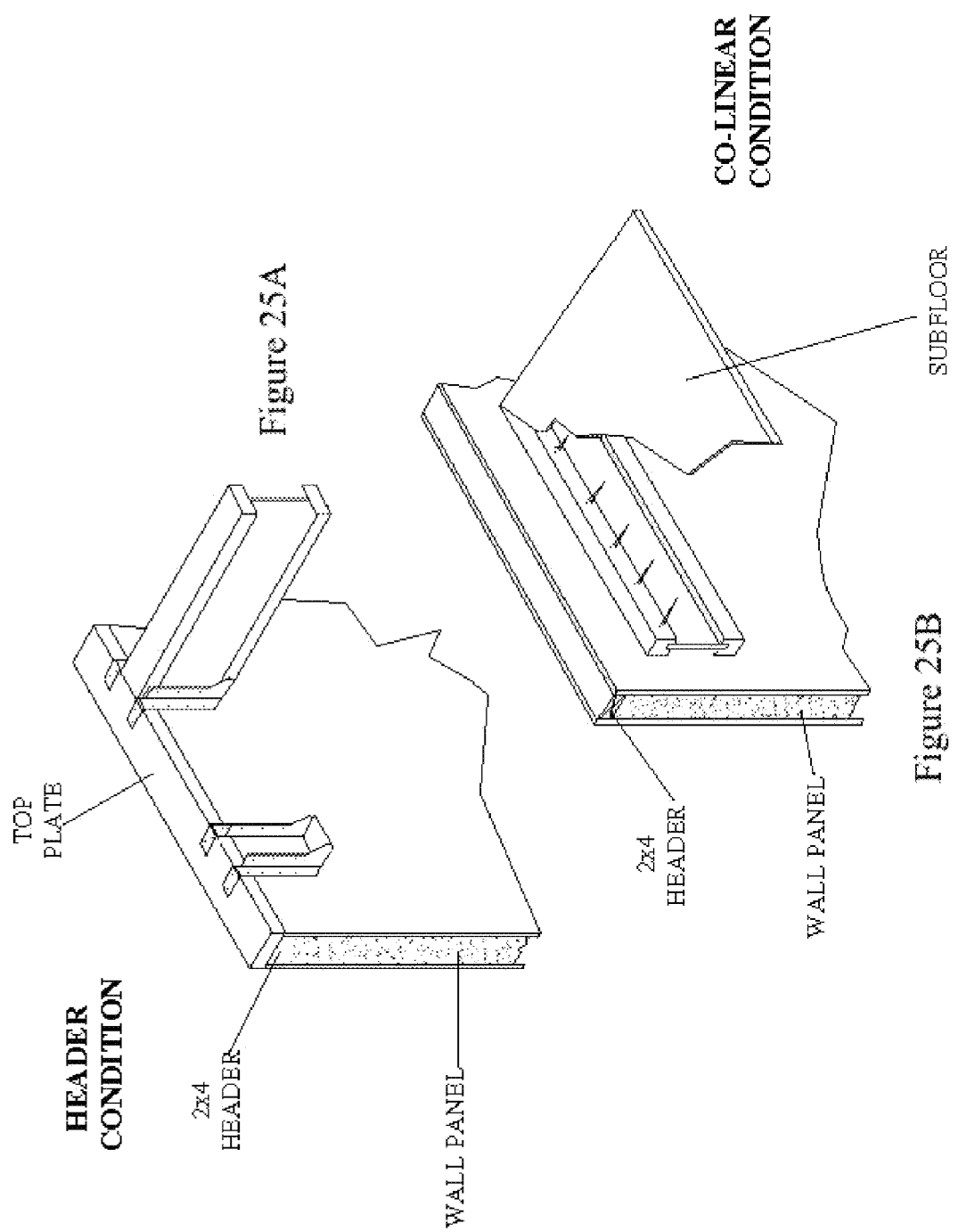
Figure 26:
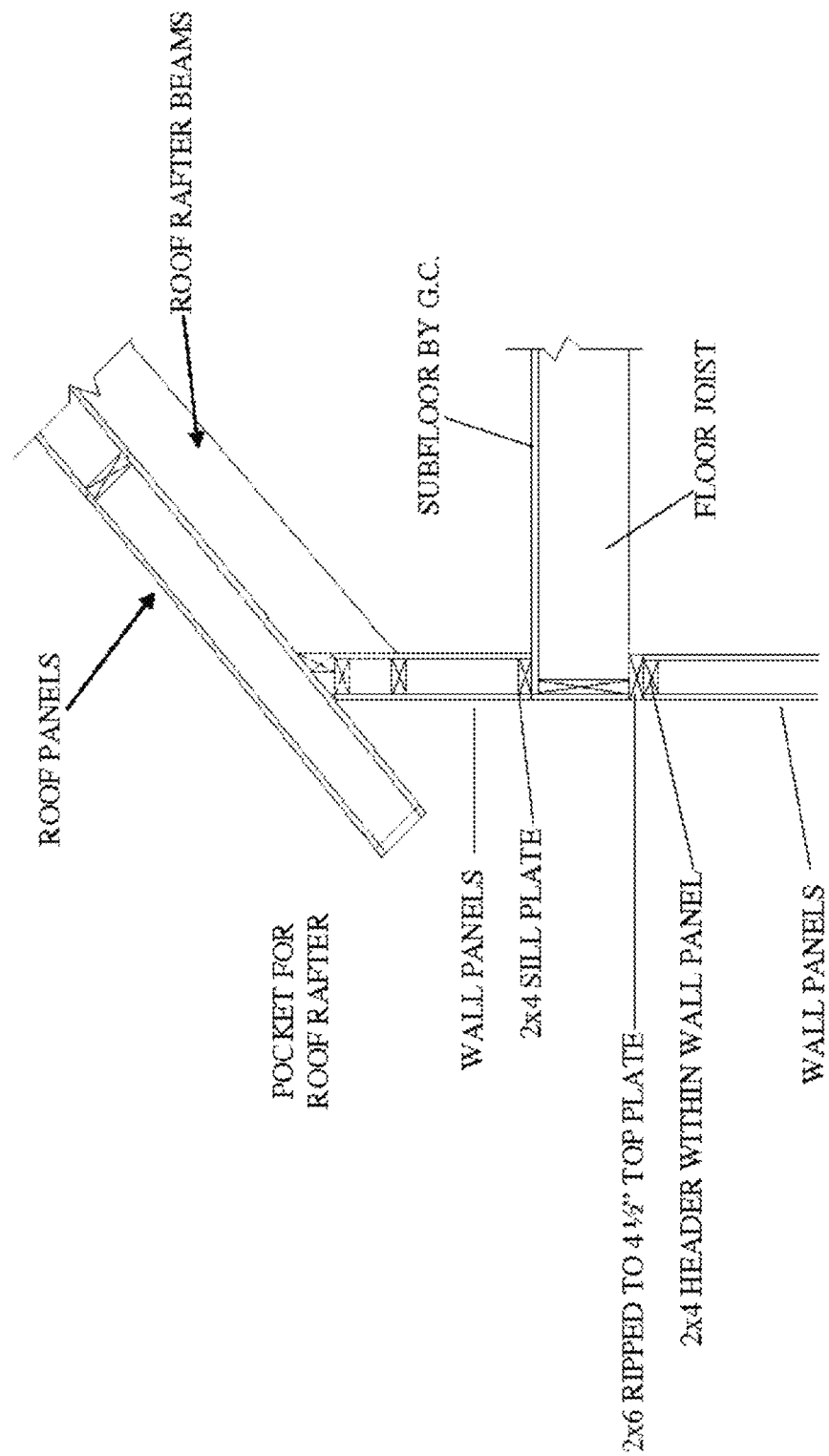
Figure 27B:
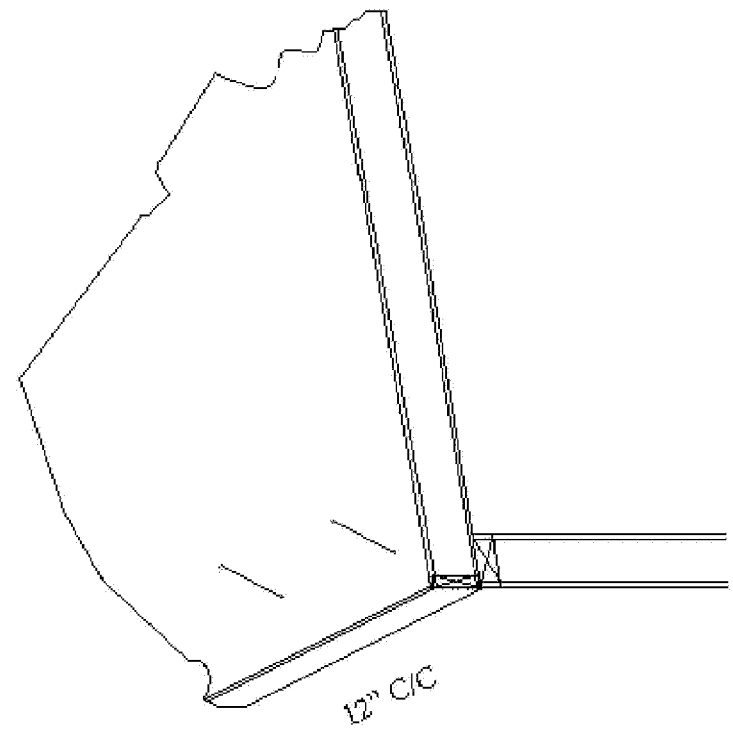
FIGS. 27A and 27B illustrate partial perspective views of wall panels with overhanging roof detail and flush roof detail, respectively.
Figure 27A:
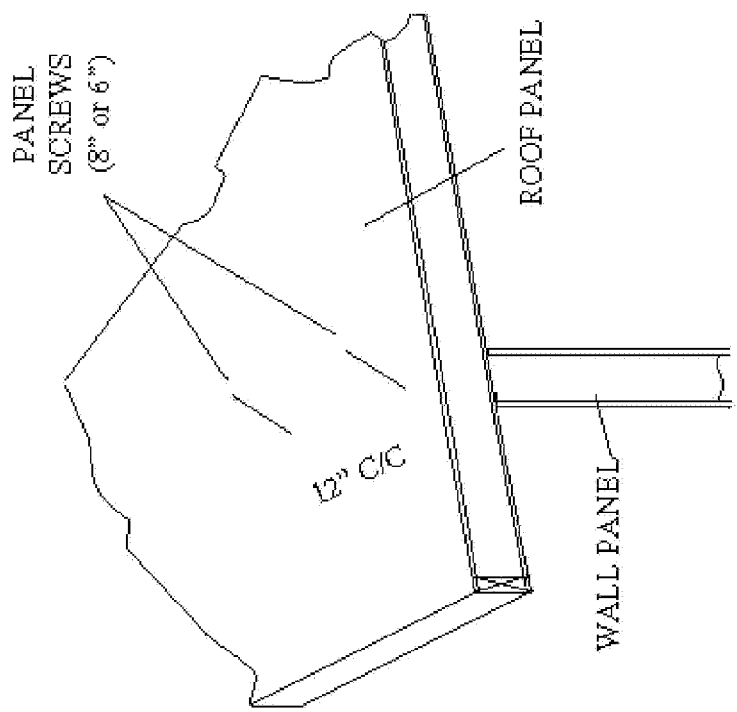

FIG. 25A illustrates a cut-away partial perspective view of a header condition component wall panel; FIG. 25B illustrates a cut-away partial perspective view of a co-linear condition component wall panel. FIG. 26 illustrates a partial cut-away front view of an installation of components according to the present invention. FIGS. 27A and 27B illustrate partial perspective views of wall panels with overhanging roof detail and flush roof detail, respectively. FIG. 28 illustrates a front partial view of an overhand roof assembly. FIG. 29 illustrates a partial perspective view of a roof assembly, including a close-up view of a female camlock area of a roof panel according to the present invention.

Regarding installation of a building as illustrated in FIGS. 1 and 2, the structure size is unlimited, as the modular components and their connection via the energy efficient seam or joint areas may be interconnected without limitation to size; however, for convenience of construction and in the cases of a building kit, there may be predetermined size options that range from small to very large buildings, by way of example and not limitation, such as an emergency shelter, a home or a command shelter or office. In any case, the size of the panels generally requires only two or three persons to manually maneuver the panels for complete structure erection. The materials of both the interior and the exterior siding of the panels are selected based upon the needs of the customer and the environment, but in any case the panels are both insulated and portable. Preferably, the panels are super-insulated and portable to allow the builder to get under roof and into a comfortable space in a very short period of time.

In one embodiment of the present invention for providing a structure with additional non-structural functionality, like electricity and/or plumbing, items such as electrical junction boxes, conduit or radiant heating coils are preferably molded inside of the panels, constructed and configured in such a way on site as to add additional value to the structure. Beneficially, the structure is assembled quickly and may be pre-fitted with conduit (for example as delivered to the site in the self-contained kit, preferably in a shipping container), to allow for quick installation of a fully-equipped building, including electrical functionality. Doors, windows, and predetermined wall panel components are also preferably delivered with and included in a building kit, if optionally desired. Preferably, openings for the windows and doors are pre-framed in the panels in a manner that allows for rapid window and door installation on site, without additional time or materials required for framing and installation. Roof beam pockets are also preferably pre-set in the top of panels to facilitate the placement of rafter or ridge beams to allow for the support of the insulated roof panels. Additionally the panels of the present invention, may further include conduit molded into the panels for receiving electrical wiring, plumbing, and/or pre-molded electronic devices, by way of example and not limitation, temperature, proximity, pressure or humidity sensors that are wireless and communicate back to a central hub within a building to control functions like lighting, HVAC (such as closing vents in one room or opening in another), or general health of the structure (such as pest detection, structural deterioration, humidity, mold, etc.), power metering information, thermal or moisture or stress indicators, occupant locator info, GPS link, wireless devices for signal transmission/receive, wireless devices for power transmission, embedded LED lighting, camera technology and other useful technological components.

In another embodiment of the present invention, molded fiberglass is used in the modular wall panels; molded composites provide inexpensive, stronger and less thermally conductive panels, and thereby provide improved energy efficiency and overall improved modular panel. Also, further composite enhancement for specific strength and/or protective functionality is provided, based on specific requirements. By way of example, an additional or replacement layer of ballistic resistant material and/or composite facing is provided, and preferably attached or integrated with the modular wall panels of the present invention (including but not limited to Kevlar composite sheets).

In such a preferred embodiment, the entire system is packed as a complete kit within a cargo container or standard shipping container. This optimized packaging for using the container facilitates the delivery and storage of multiple containers in a central location until such time as needed for rapid erection of a structure, for example in the case of an unexpected natural disaster. This building kit also preferably includes a complete tool kit to facilitate complete assembly of the structure; the building kit may also include items such as an electric generator, limited fuel for the generator, a renewable power source such as solar panels or wind turbines, water and basic non-perishable foodstuffs, thereby providing for a complete emergency shelter that can be occupied and used immediately upon delivery and installation, without requiring any separate tools, supplies, or equipment to be a fully-functioning facility or shelter. The container may also include cabinets, sinks, toilets, showers and even furniture for installation within the modular building to provide for immediate and also possibly long-term occupancy in the shelter. The cargo container could then be used as a secondary structure for storage if left on the site.

Advantageously, the panels of the present invention are the most advanced structurally insulated building panel to date. The present invention provides a modular building system for creating an energy-efficient structure including: a multiplicity of pre-fabricated panel wall components and roof components, each having a face side and a back side and four edges including at least two spaced-apart parallel tracks that run the length of at least two opposite edges for aligning the edges together to form a seam, wherein the components do not require additional locking components for securely attaching the components together along the seams, since the rail systems that align and secure the joining at the seams of two panel components provide for friction-based locking and wall panel stability, while still providing energy efficient seams.

Also, methods for providing a modular building structure including the steps of: providing a modular building system further comprising a predetermined number of modular wall components, a roof system, and at least one door; providing instructions for assembling the modular building system for forming a complete building unit, including aligning the modular panel components along their opposite edges via at least two mating rail systems of the two panel components. The rail systems may be selected from alternating rails that are spaced apart and extend vertically along the edge and that correspondingly mate with spaced apart cavities in the second panel component; at least one rail and tabs system protruding from one edge and mating with corresponding cavities in the other edge of the adjoining panel component; alternating protruding rail and cavity in each edge that mates with corresponding cavity and rail in the adjoining panel component; interleavable laminae that alternatingly extend from the wall component body plane at the edge and extend along the length of the edge that provide a means for alignment and friction-based locking of the panel components when connected; or combinations thereof, to provide an energy efficient seam when wall components are joined.

One application for the present invention includes a structure or building for a command or support center after an emergency to be erected on a flat surface. Other applications include but are not limited to medical center, school or residential structures. In preferred embodiments of the modular buildings, the modular panel components for assembling to form a basic structure include modular pre-fabricated panel wall components and/or roof components, each having a face side and a back side and four edges including spaced-apart parallel interleavable laminae that run the length of at least two opposite edges for aligning the edges together to form a seam by interleaving the laminae, wherein the laminae provide a means for friction-based locking of the components without requiring additional locking components for securely attaching the components together along the seams.

Prefabricated panel components may be provided in a pre-configured kit including window panels, door panels, corner panels, beam pocket panels and window(s) that may be pre-set into at least one panel component, in particular a wall panel; at least one door frame fitted to allow final site placement quickly and easily; at least one ventilation fan pre-installed in panel; and wherein the panels have at least some finishing on the face side that would be externally or outwardly facing upon assembly and installation for the building structure, by way of example and not limitation the face side finish includes a pre-finished exterior siding such as commercially offered by Hardi Panel or LP SmartSide; bullet resistant layer(s); a plurality of structural members for supporting roof structure including a modular box beam with joints secured by pins; at least one composite sill plate and secondary base plate with flashing for foundation; tools required for structure assembly including panel cam-locks, sealant foam, foam applicators, etc.; instructions, plans, and figures illustrating assembly in at least one language or even multiple language(s) as required, preferably including figures showing step-wise assembly and installation, as well as an indication or listing of all the parts and components within the kit and how they relate to each other; rigid flashing for the top roof ridge (at the junction of the two different panel slopes), roof lining material, finished roofing material, modular electrical baseboard outlet kit; communications system or equipment (such as by way of example and not limitation, a communication system for satellite-based telecommunication of voice and/or data); scaffolding if wall panels were greater than about 8 ft. in height; Universal Power Supplies & filter (UPS) for sensitive electronic equipment; solar panels (PV or solar-thermal) for attachment or integration with select panels, preferably roof panels; FRP laminated panel interior (like for medical or school application); at least one bathroom module including sink and toilet, and preferably a shower unit.

Also, supplemental or specific power supply alternatives may be provided, including by way of example and not limitation, a wind power generator, water power generator, solar power equipment, which may be connectable to or embedded with the panel components in predetermined configurations, etc.

One application of the modular buildings according to the present invention is to provide emergency shelters that would be deliverable to a site or location in advance of or following an emergency situation, such as weather catastrophe, illness outbreak, or may also be provided in advance of construction of larger buildings.

While the present invention modular buildings formed from the components described herein are suitable for long-term use, they may also be used for temporary buildings or for limited time specific use buildings. A temporary building may exploit the technology described and enabled herein by locking the panels together using a combination of laminae, tongue and grooves, and/or cam-locks such that the entire structure can be disassembled at any time. In one embodiment, the base of the cam-lock mechanism may be rotated using the key or tool such that the arm or hook disengages from the female recess and/or pin, thereby allowing the two panels to be separated.

Figure 31:
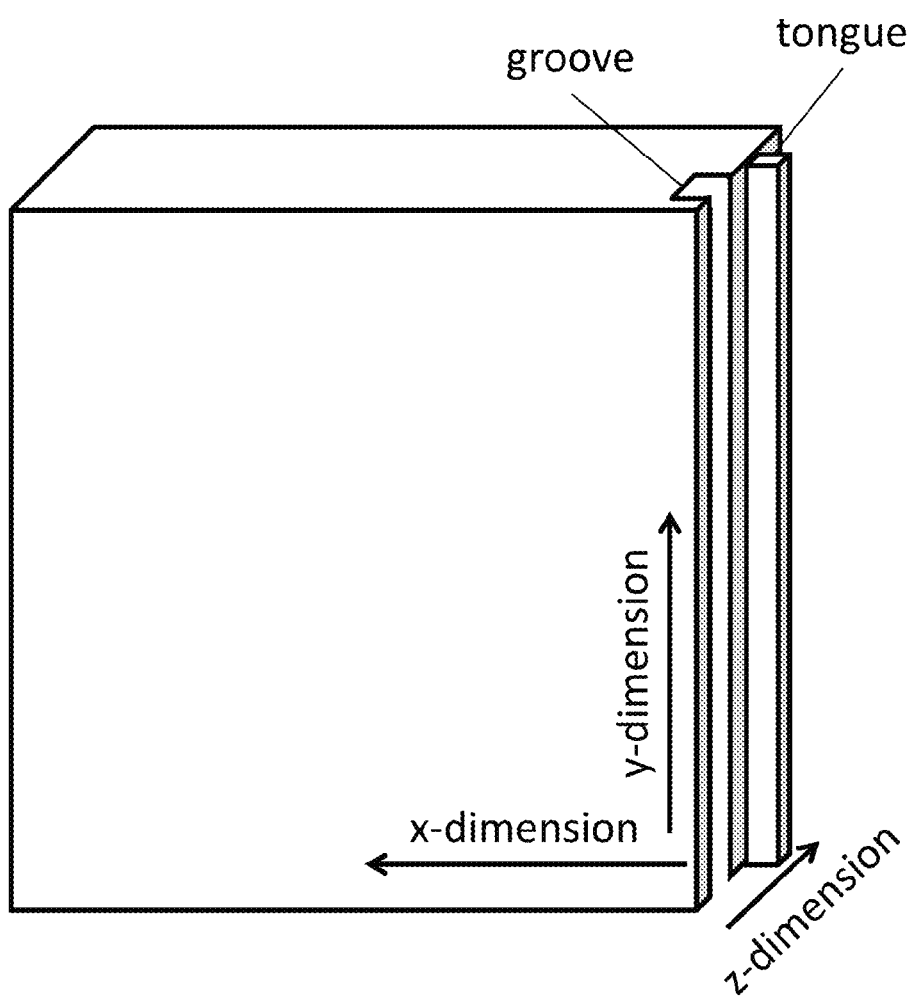

Polyurethane panels are preferred for the present invention. The polyurethane polymer has several physical characteristics that are necessary to provide all the desired features of the present invention. These physical properties are rigidity/compression strength, thermostability, thermal insulation, adhesiveness and fire-resistance. The polyurethane extends to the edges of the panel, forming a continuous polyurethane layer in the x-, y- and z-dimensions (FIG. 31). For corners, the x- and y-dimensions are the planar surfaces of each of the extensions from the corner. The z-dimensions are the depth or thickness of each of the extensions. Thus, corners have multiple x-, y- and z-dimensions.

Structural rigidity (compression strength). The polyurethane panels provide structural rigidity to support loads. The loads are continuous static vertical loads from the structure, variable vertical live loads and occasional horizontal loads due to wind, earthquakes and similar forces.

Thermostability. The polyurethane has a very low coefficient of thermal expansion, resulting in a panel that does not expand or contract significantly with temperature. This means that the construction does not lose adherence between components over time with temperature cycling, resulting in a structure that remains tightly insulative and structurally adherent.

Insulation. The polyurethane provides a high R-factor of insulation, which is a desirable characteristic for most structures.

Adhesiveness. The polyurethane also provides for high adhesiveness to components embedded in the polyurethane and between panels at seams where panels meet. The embedded components can include locks, conduits, tubing and the like.

Tongue-and-groove joints are formed along the panel edges to provide alignment and adherence. The tongue-and-groove joints are preferably static, orthogonally-shaped and orthogonally oriented with respect to the greater plane of panel. That is, the sides and ends of the groove and the joint are designed and configured to slide into one another without requiring any out-of-plane movement of the panels. The tongue and groove joints are designed and configured such that the edges are entirely flush and in contact with one another throughout the joint. This provides maximal static friction in the joint between the edges that form the joint.

In a preferred embodiment the rail or lamina that forms the tongue is covered by a rail component with sufficient hardness that is embedded in the polyurethane foam during construction. The rail component is of sufficient hardness to prevent deformation of the rail during handling and during elevated temperatures. The rail component can be made from materials such as metals, such as steel, aluminum, and thermosetting plastics, such as polyurethanes, polyesters, epoxy resins and phenolic resins; and the like.

Figure 30:
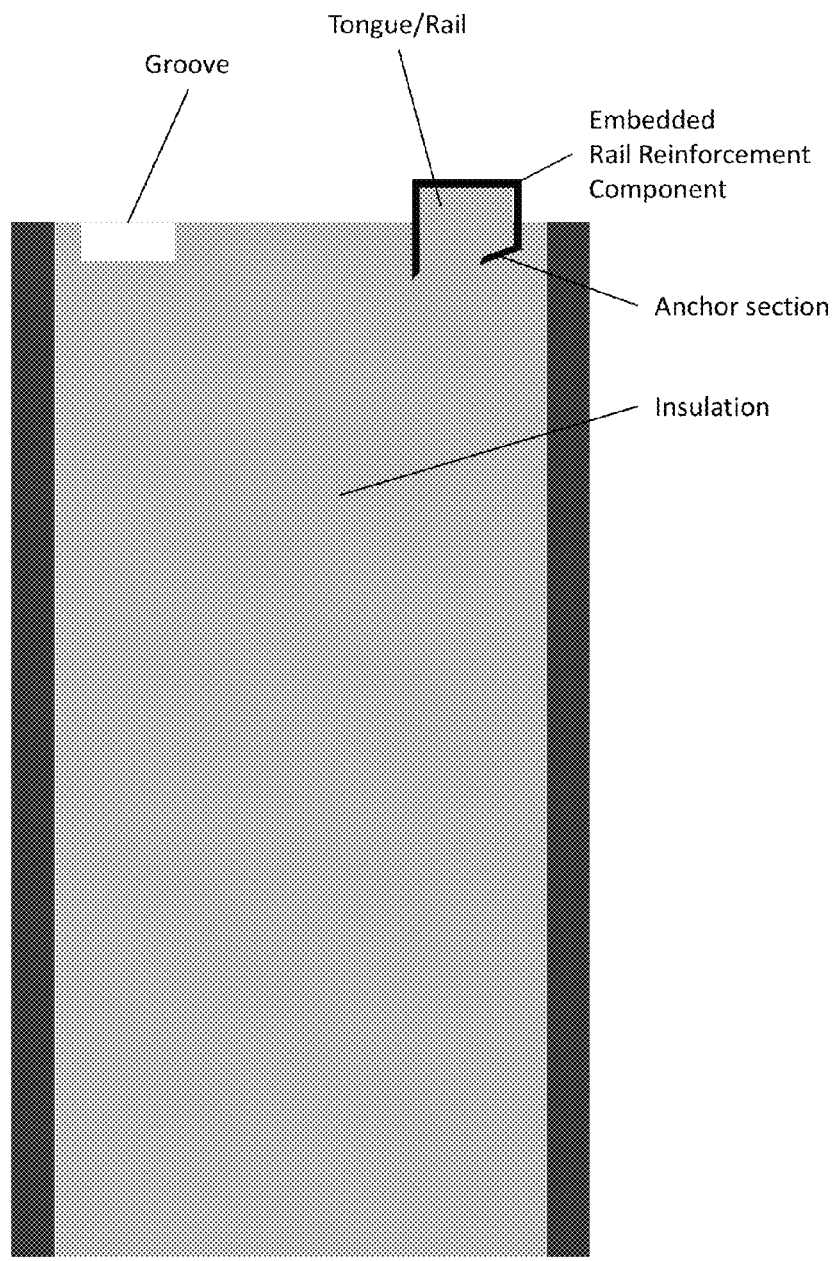

As is embodied in FIG. 30, the geometry of the rail component is designed to include an anchor section that is not parallel to the side of the rail and is embedded in the polyurethane foam. This anchor section helps prevents the rail from disengaging from the insulation.

The groove component is preferably bare polyurethane. The bare polyurethane provides additional adhesiveness between the tongue and groove components.

Corner components are formed of a unitary polyurethane foam piece to provide resistance to transverse forces (torsion) at the corner of the building.

Transverse force (torsion). The unitary construction of the corner components provides for the transfer of frontal or racking forces onto perpendicular walls as transverse forces. As a unitary component the corners according to the present invention are structurally stronger than the prior art constructions. The prior art corners for standard 2×4 stud construction are basically two wall ends, formed of 2×4 studs, joined together by a few nails. Thus, the force is transferred from the front wall to the side walls through a few nails. For this structural reason prior art constructions frequently buckle at the corners.

Racking force, or frontal force, causes transverse force on perpendicular walls. The racking forces are resisted through the tongue and groove joints between panels as previously described and the other connections with the roof and floor. These connections provide sufficient structural counterforces to resist deformation caused by frontal racking forces.

Continuous Insulation. The unitary and integral structure of the corner components provide for a greater and continuous insulative value than the prior art. The insulation is continuous, since the corners are 1) unitary polyurethane foam and 2) the edges of the panels and other components are compressed together. In contrast, the prior art, composed of wooden or metallic beams at the edges and corners, do not provide a continuous, high-R-factor insulation as the present invention.

Knock-down compressing fastener. Knock-down fasteners are a hardware device made for the purpose of constructing butt joints that can be assembled and re-assembled repeatedly (hence knock-down). The members are brought together and the joint is compressed and secured with the fastener. Such a joint may be embodied by a cam compressor lock.

Cam compressor lock. The cam compressor lock functions to compress the panels together and lock them in this position. Pulling the panels together compresses the edges together to form a tighter seal than could be otherwise achieved through other means of applying force. Furthermore, the compression causes greater adherence between the edges of the panels. The cam locks are embedded within the polyurethane panel. The structural strength of the polyurethane allows for a significant amount of force to be exerted on the cam lock mechanism when closing the cam lock. The force draws the panels together tightly, compressing the edges and creating a static friction between the panels that is sufficient to hold the panels together under greater loads than would be possible by the cam lock and structural geometry of the tongue-and-groove joint alone. The adhesiveness of the exposed polyurethane on the groove component and the other exposed surfaces provides more adhesiveness than a covered edge would. Thus, in contrast to the prior art, the present invention preferably has exposed polyurethane edges to provide greater adhesiveness and therefore greater static friction between panels, thereby providing greater structural integrity to the assembled structure. This greater structural integrity reduces the risk of catastrophic failure.

Another fastening means is pocket-hole joinery, or pocket-screw joinery, which involves drilling a hole at an angle—usually 15 degrees—into one panel, and then joining it to a second panel with a self-tapping screw. In this case the various components necessary to retain the screw are again embedded in the polyurethane foam.

Thus the wall panels, corner panels and the roof/ceiling panels provide structural integrity through a combination of tongue-and-groove joints, knock-down compressing fasteners, and exposed polyurethane surfaces.

Continuous insulation. A structure designed and configured with components of the present invention and according to the present invention thus provides a combination of characteristics that provide for a continuous insulative barrier in the x- and y-dimensions of a wall and in corners.

Fire-resistant. The polyurethane makes the panels more flame-resistant than other insulation, and furthermore the polyurethane can be made more fire-resistant by the addition of flame-retardant materials, thus providing additional safety and structural integrity during elevated temperatures or direct flame. For example, polyphosphazene can be added to provide flame-retardant properties. Polyurethane is rated to 250 degrees Fahrenheit and does not melt under the effects of fire. The fire resistance of the present invention is thus totally continuous both in length and in depth. When describing the panels as having an x, y and z dimensions (FIG. 31), the panel and corner components and structures made from these components are continuously fire-resistant to greater than 250 degrees Fahrenheit in these three dimensions over the entire extent of the component.

Certain modifications and improvements will occur to those skilled in the art upon a reading of the foregoing description. By way of example and not limitation, the present invention provides a modular panel that is either insulative or non-insulative, but that still provides energy efficient corners that are seamless and that provide for structural integrity and strength. In a "sandwich" panel, a core material is positioned between two spaced apart siding materials as illustrated hereinabove, the panel functions as a structural element, similar to an I-beam, wherein the interior core material is the web and the siding materials are like the flanges of an I-beam; thus, it is the materials acting together that provide significant structural strength to the panel. In applications of tropical climate, insulation may not be as important a factor as low-cost construction, so insulative materials could be eliminated and replaced with non-insulative materials or less insulative materials, while still providing structural integrity and strength but preventing moisture or insects.

The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A modular building structure with continuous insulation comprising:
    at least one wall panel component and at least one corner panel component, each of the components including:
    at least two faces and at least two edges;
    a continuous and complete polyurethane insulation between the faces and edges; and
    wherein each of the edges includes an exposed portion of the polyurethane insulation;
    the edge of at least one of the panel components configured to adjoin the edge of at least one of the corner components to form a joint; and
    the joint including:
        a rail protruding from each of the edges for friction-based locking; and
        a knockdown compressing fastener embedded in the polyurethane insulation that extends between a first unlocked position and a second position for mechanical locking.

2. The structure of claim 1, further including siding on at least one of the faces of at least one of the panel components.

3. The structure of claim 1, wherein at least one of the panel components further includes at least one element selected from the group consisting of: a window; an electrical conduit; electrical wiring; switches; outlets; lighting fixtures; plumbing; plumbing elements; and an electronic device.

4. The structure of claim 1, wherein the knock-down compressing fastener is a cam lock.

5. The structure of claim 1, wherein each of the corner components is selected from the group consisting of an L-shaped corner, a T-shaped corner, and a plus-shaped corner.

6. The structure of claim 1, wherein the knock-down compressing fastener is a cam lock component.

7. The structure of claim 1, wherein the insulation is fire resistant.

8. A modular building structure with continuous insulation comprising:
    at least one wall panel component and at least one corner panel component, each of the components including:
    at least two faces and at least two edges;
    a continuous and complete polyurethane insulation between the faces and edges; and
    wherein each of the edges includes an exposed portion of the polyurethane insulation;
    the edge of at least one of the panel components configured to adjoin the edge of at least one of the corner components to form a joint; and
    the joint including:
        a rail protruding from each of the edges for friction-based locking, each of the rails separated from the faces by a distance; and
        a knock-down compressing fastener that extends between a first unlocked position and a second position for mechanical locking.

9. The structure of claim 8, wherein two of the rails are trans-configured and substantially similar is shape.

10. The structure of claim 8, further including siding on at least one of the faces of at least one of the panel components.

11. The structure of claim 8, wherein at least one of the panel components further includes at least one element selected from the group consisting of: a window; an electrical conduit; electrical wiring; switches; outlets; lighting fixtures; plumbing; plumbing elements; and an electronic device.

12. The structure of claim 8, wherein the knock-down compressing fastener is a cam lock.

13. The structure of claim 8, wherein each of the corner components is selected from the group consisting of an L-shaped corner, a T-shaped corner, and a plus-shaped corner.

14. The structure of claim 8, wherein the knock-down compressing fastener is a cam lock component.

15. The structure of claim 8, wherein the insulation is fire resistant.

16. A modular building structure with continuous insulation comprising:
    at least two wall panel components, each of the components including:
    at least two faces and at least two edges;
    a continuous and complete polyurethane insulation between the faces and edges; and
    wherein each of the edges includes an exposed portion of the polyurethane insulation;
    the edge of at least one of the panel components configured to adjoin the edge of at least another of the panel components to form a joint; and
    the joint including:
        a rail protruding from each of the edges for friction-based locking, each of the rails having a mating groove positioned on the opposite edge and each of the rails separated from the faces by a distance; and
        a knock-down compressing fastener that extends between a first unlocked position and a second position for mechanical locking.

17. The structure of claim 16, further including siding on at least one of the faces of at least one of the panel components.

18. The structure of claim 16, wherein at least one of the panel components further includes at least one element selected from the group consisting of: a window; an electrical conduit; electrical wiring; switches; outlets; lighting fixtures; plumbing; plumbing elements; and an electronic device.

19. The structure of claim 16, wherein the knock-down compressing fastener is a cam lock.

20. The structure of claim 16, wherein the knock-down compressing fastener is a cam lock component.

* * * * *